(12) United States Patent
Ramanathan et al.

(10) Patent No.: US 7,974,877 B2
(45) Date of Patent: Jul. 5, 2011

(54) SENDING AND RECEIVING ELECTRONIC BUSINESS CARDS

(75) Inventors: Rajesh Ramanathan, Redmond, WA (US); Peter Allenspach, Sammamish, WA (US); Radu Bacioiu, Kirkland, WA (US); Liang-Yu Chi, San Francisco, CA (US); David Michael Gray, Seattle, WA (US); Victor Erwin Romano, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 11/159,837

(22) Filed: Jun. 23, 2005

(65) Prior Publication Data

US 2006/0293903 A1 Dec. 28, 2006

(51) Int. Cl.
G06F 170/60 (2006.01)

(52) U.S. Cl. ............... 705/14.55; 705/14.49; 705/14.53; 705/14.56; 705/14.72; 705/14.73

(58) Field of Classification Search ............... 705/14, 705/14.49, 14.53, 14.55, 14.56, 14.72, 14.73
See application file for complete search history.

(56) References Cited

U.S. PATENT DOCUMENTS

| | | |
|---|---|---|
| 5,493,105 A | 2/1996 | Desai ............................ 235/375 |
| 5,732,229 A | 3/1998 | Dickinson ..................... 395/334 |
| 5,764,629 A | 6/1998 | Bower et al. |
| 5,774,117 A | 6/1998 | Kukkal et al. ................. 345/330 |
| 5,845,261 A | 12/1998 | McAbian |
| 5,852,807 A | 12/1998 | Skarbo et al. ..................... 705/7 |
| 6,137,710 A | 10/2000 | Iwasaki et al. |
| 6,157,954 A | 12/2000 | Moon et al. ..................... 709/228 |
| 6,175,741 B1 | 1/2001 | Alperovich |
| 6,195,686 B1 | 2/2001 | Moon et al. ..................... 709/206 |
| 6,254,001 B1 | 7/2001 | Chan ............................ 235/380 |
| 6,397,219 B2 | 5/2002 | Mills ................................ 1/1 |
| 6,442,263 B1 * | 8/2002 | Beaton et al. ............ 379/142.04 |
| 6,533,171 B1 | 3/2003 | Porter |
| 6,760,728 B1 | 7/2004 | Osborn |
| 6,816,725 B1 | 11/2004 | Lemke et al. ............... 455/414.1 |
| 6,857,072 B1 | 2/2005 | Schuster et al. ............... 713/160 |
| 6,868,426 B1 | 3/2005 | Mankoff ..................... 707/104.1 |
| 6,873,861 B2 | 3/2005 | Awada et al. ................. 455/566 |
| 6,883,000 B1 * | 4/2005 | Gropper ............................... 1/1 |
| 6,888,927 B1 | 5/2005 | Cruickshank et al. ..... 379/88.11 |
| 6,889,213 B1 | 5/2005 | Douvikas et al. ............... 705/67 |
| 6,954,934 B2 | 10/2005 | Kumar |

(Continued)

FOREIGN PATENT DOCUMENTS

JP 02-044467 2/1990

(Continued)

OTHER PUBLICATIONS

U.S. Appl. No. 11/149,838, filed Jun. 23, 2005, Ramanathan et al.
U.S. Appl. No. 11/159,840, filed Jun. 23, 2005, Ramanathan et al.
PCT, International Search Report, Aug. 15, 2007, pp. 7.
PCT Application No. PCT/US2006/17582, International Search Report, Jul. 27, 2007, pp. 7.

(Continued)

*Primary Examiner* — James W Myhre
*Assistant Examiner* — Michael Goldman
(74) *Attorney, Agent, or Firm* — Merchant & Gould, P.C.

(57) ABSTRACT

Graphical visual representations of electronic business cards may be generated from associated contact file information. Electronic business cards may be sent and received over digital media. Contacts information associated with received electronic business cards may be used for adding to or updating information contained in a recipient's electronic contact files.

17 Claims, 18 Drawing Sheets

U.S. PATENT DOCUMENTS

| | | | |
|---|---|---|---|
| 6,983,371 B1 | 1/2006 | Hurtado et al. | 713/189 |
| 7,003,546 B1 | 2/2006 | Cheah | 709/200 |
| 7,007,068 B2 | 2/2006 | Morkel | 709/206 |
| 7,017,109 B1* | 3/2006 | Douvikas et al. | 715/236 |
| 7,039,869 B2 | 5/2006 | Smith | |
| 7,043,531 B1* | 5/2006 | Seibel et al. | 709/206 |
| 7,047,041 B2* | 5/2006 | Vanska et al. | 455/558 |
| 7,062,656 B2 | 6/2006 | Richards et al. | |
| 7,109,985 B2 | 9/2006 | Spencer et al. | |
| 7,228,335 B2 | 6/2007 | Caughey | 709/206 |
| 7,246,099 B2 | 7/2007 | Feldhahn | 705/65 |
| 7,255,267 B2* | 8/2007 | Chao | 235/380 |
| 7,280,975 B1* | 10/2007 | Donner | 705/10 |
| 7,289,110 B2* | 10/2007 | Hansson | 345/173 |
| 7,322,007 B2 | 1/2008 | Schowtka et al. | 715/513 |
| 7,337,127 B1 | 2/2008 | Smith et al. | 705/14 |
| 7,387,234 B2* | 6/2008 | Kanatani et al. | 235/375 |
| 7,451,099 B2* | 11/2008 | Henkin et al. | 705/14 |
| 7,483,179 B2* | 1/2009 | Stumbo et al. | 358/402 |
| 7,607,084 B2* | 10/2009 | Malone et al. | 715/255 |
| 7,753,260 B2 | 7/2010 | Kanatani et al. | |
| 7,814,438 B2 | 10/2010 | Grossman et al. | 715/854 |
| 2001/0021935 A1 | 9/2001 | Mills | |
| 2001/0027472 A1 | 10/2001 | Guan | 709/203 |
| 2001/0032251 A1 | 10/2001 | Rhoads et al. | |
| 2002/0013815 A1 | 1/2002 | Obradovich et al. | 709/204 |
| 2002/0035566 A1 | 3/2002 | Rugg | |
| 2002/0055955 A1 | 5/2002 | Lloyd-Jones et al. | |
| 2002/0095384 A1 | 7/2002 | Pestoni et al. | 705/51 |
| 2002/0107938 A1 | 8/2002 | Moroney et al. | 709/218 |
| 2002/0116396 A1 | 8/2002 | Somers et al. | 707/200 |
| 2002/0130185 A1 | 9/2002 | LaForge et al. | 235/487 |
| 2002/0133482 A1 | 9/2002 | Wen Hung | 707/3 |
| 2002/0138633 A1 | 9/2002 | Angwin et al. | 709/229 |
| 2002/0152086 A1 | 10/2002 | Smith et al. | 705/1 |
| 2002/0188606 A1 | 12/2002 | Sun et al. | 707/10 |
| 2003/0020959 A1* | 1/2003 | Henry | 358/402 |
| 2003/0050920 A1 | 3/2003 | Sun | 707/2 |
| 2003/0066877 A1 | 4/2003 | Howard et al. | 235/380 |
| 2003/0110130 A1 | 6/2003 | Pelletier | 705/70 |
| 2003/0131001 A1 | 7/2003 | Matsuo | 707/9 |
| 2003/0158860 A1 | 8/2003 | Caughey | 709/206 |
| 2003/0158893 A1 | 8/2003 | Komatsu et al. | 709/203 |
| 2003/0163705 A1 | 8/2003 | Richards, Jr. et al. | 713/182 |
| 2003/0203744 A1 | 10/2003 | Otsuka | |
| 2004/0019521 A1 | 1/2004 | Birmingham | 705/14 |
| 2004/0076345 A1 | 4/2004 | Olszak et al. | |
| 2004/0153328 A1 | 8/2004 | Macholda | |
| 2004/0181517 A1 | 9/2004 | Jung et al. | |
| 2004/0181540 A1 | 9/2004 | Jung et al. | |
| 2004/0207878 A1 | 10/2004 | Ferlitsch | |
| 2004/0243496 A1 | 12/2004 | Kim et al. | 705/35 |
| 2004/0243930 A1 | 12/2004 | Schowtka et al. | 715/513 |
| 2005/0010490 A1 | 1/2005 | Liu | 705/26 |
| 2005/0091074 A1 | 4/2005 | Feidhahn | |
| 2005/0103838 A1 | 5/2005 | Slotkin et al. | 235/380 |
| 2005/0113025 A1 | 5/2005 | Akamatsu et al. | 455/41.3 |
| 2005/0122543 A1 | 6/2005 | Walker | 358/1.18 |
| 2005/0165621 A1 | 7/2005 | Lapstun et al. | 705/1 |
| 2005/0182644 A1 | 8/2005 | Douvikas et al. | |
| 2005/0233697 A1 | 10/2005 | Yu | |
| 2005/0239439 A1 | 10/2005 | Manabe | 455/410 |
| 2005/0251448 A1 | 11/2005 | Gropper | |
| 2005/0289474 A1 | 12/2005 | Master et al. | 715/765 |
| 2006/0038447 A1 | 2/2006 | Bruelle-Drews | |
| 2006/0065707 A1 | 3/2006 | Kanatani et al. | 235/375 |
| 2006/0065708 A1 | 3/2006 | Kanatani et al. | |
| 2006/0075050 A1 | 4/2006 | Kanatani et al. | 709/206 |
| 2006/0075231 A1 | 4/2006 | Yu et al. | 713/168 |
| 2006/0088214 A1* | 4/2006 | Handley et al. | 382/176 |
| 2006/0184574 A1 | 8/2006 | Wu et al. | |
| 2006/0229988 A1 | 10/2006 | Oshima et al. | 705/50 |
| 2006/0270388 A1 | 11/2006 | Veeramachaneni et al. | |
| 2006/0293904 A1 | 12/2006 | Ramanathan et al. | 705/1 |
| 2006/0293905 A1 | 12/2006 | Ramanathan et al. | 705/1 |
| 2007/0156831 A1 | 7/2007 | Quine | 709/206 |
| 2009/0116687 A1 | 5/2009 | Rhoads et al. | |
| 2009/0216839 A1 | 8/2009 | Yokoyama | |
| 2009/0217199 A1 | 8/2009 | Hara et al. | |

FOREIGN PATENT DOCUMENTS

| | | |
|---|---|---|
| JP | 07-064923 | 10/1995 |
| JP | 08-008962 | 1/1996 |
| JP | 08-147289 | 6/1996 |
| JP | 10-190645 | 7/1998 |
| JP | 99/29127 | 10/1999 |
| JP | 2001-243221 | 9/2001 |
| JP | 2001-249863 | 9/2001 |
| JP | 2001-282793 | 10/2001 |
| JP | 2002-297855 | 10/2002 |
| JP | 2002-334046 | 11/2002 |
| JP | 2003-006161 | 1/2003 |
| JP | 2003-30211 | 1/2003 |
| JP | 2003-123035 | 4/2003 |
| JP | 2003-309552 | 10/2003 |
| JP | 2003-348077 | 12/2003 |
| JP | 2004-164166 | 6/2004 |
| JP | 2004-192138 | 7/2004 |
| JP | 2004-362264 | 12/2004 |
| JP | 2005-018746 | 1/2005 |
| JP | 4416644 | 12/2009 |
| WO | WO 2007/001638 A2 | 1/2007 |
| WO | WO 2007/005606 A2 | 1/2007 |
| WO | WO 2007/016434 A2 | 1/2007 |
| WO | WO 2007/005606 A3 | 6/2007 |
| WO | WO 2007/016434 A3 | 10/2007 |
| WO | WO 2007/001638 A3 | 11/2007 |

OTHER PUBLICATIONS

PCT, Application No. PCT/US2006/25574, International Search Report, Mar. 29, 2007, pp. 9.

U.S. Office Action mailed Apr. 7, 2008 in U.S. Appl. No. 11/159,838.

U.S. Office Action mailed Oct. 26, 2007 in U.S. Appl. No. 11/023,614.

U.S. Final Office Action mailed Jun. 16, 2008 in U.S. Appl. No. 11/023,614.

U.S. Office Action mailed Feb. 6, 2006 in U.S. Appl. No. 11/023,602.

U.S. Final Office Action mailed Jul. 24, 2006 in U.S. Appl. No. 11/023,602.

U.S. Office Action mailed Dec. 19, 2007 in U.S. Appl. No. 11/023,602.

U.S. Office Action mailed May 13, 2008 in U.S. Appl. No. 11/023,617.

U.S. Office Action mailed Nov. 6, 2006 in U.S. Appl. No. 11/023,612.

U.S. Office Action mailed Apr. 19, 2007 in U.S. Appl. No. 11/023,612.

U.S. Final Office Action mailed Sep. 25, 2007 in U.S. Appl. No. 11/023,612.

U.S. Final Office Action mailed Jan. 16, 2009 in U.S. Appl. No. 11/159,838.

U.S. Office Action mailed Jan. 21, 2009 in U.S. Appl. No. 11/023,614.

U.S. Final Office Action mailed Aug. 7, 2009, in U.S. Appl. No. 11/023,614.

U.S. Office Action mailed Mar. 24, 2009, in U.S. Appl. No. 11/159,840.

U.S. Office Action mailed Jun. 8, 2009, in U.S. Appl. No. 11/023,617.

U.S. Office Action mailed Sep. 4, 2009, in U.S. Appl. No. 11/023,602.

(1997) "vCard:The Electronic Business Card"; Version 2.1; A versit Consortium White Paper; http://www.imc.org/pdi/vcardwhite.html; Jan. 1997, pp. 1-4.

U.S. Office Action mailed Dec. 15, 2009 in U.S. Appl. No. 11/023,614.

U.S. Final Office Action mailed Dec. 1, 2010 in U.S. Appl. No. 11/023,602.

U.S. Final Office Action mailed Jan. 27, 2010, in U.S. Appl. No. 11/023,617.

U.S. Final Office Action mailed Oct. 15, 2009, in U.S. Appl. No. 11/159,840.

U.S. Final Office Action mailed Mar. 15, 2010, in U.S. Appl. No. 11/159,840.

U.S. Office Action mailed Sep. 8, 2010, in U.S. Appl. No. 11/917,673.

Notice of Allowance issued in U.S. Appl. No. 11/023,612, dated Feb. 13, 2008, 6 pages.

Non Final Office Action issued in U.S. Appl. No. 11/023,602, dated Feb. 16, 2007, 10 pages.

Final Office Action issued in U.S. Appl. No. 11/023,617, dated Feb. 13, 2009, 8 pages.

Non Final Office Action issued in U.S. Appl. No. 11/917,673 dated Apr. 2, 2010, 16 pages.

Final Office Action issued in U.S. Appl. No. 11/917,673 dated Sep. 8, 2010, 9 pages.

First Notice of Rejection issued in Japanese Application No. 2004-381104, dated Nov. 18, 2008, 4 pages.

Final Notice of Rejection issued in Japanese Application No. 2004-381104, dated Mar. 13, 2009, 4 pages.

First Notice of Rejection issued in Japanese Application No. 2004-381103 dated Jan. 20, 2009, 6 pages.

Notice of Allowance issued in Japanese Application No. 2004-381103 dated Oct. 23, 2009, 6 pages.

Supplementary European Search Report issued in European Application No. EP 06770057.5 dated Apr. 19, 2010, 10 pages.

Official Communication issued in European Application No. EP 06770057.5 dated May 21, 2010, 1 page.

U.S. Office Action mailed May 19, 2010, in U.S. Appl. No. 11/023,614, 35 pages.

Final Office Action issued in U.S. Appl. No. 11/159,840 dated Jul. 7, 2010, 27 pages.

Notice of Allowance issued in U.S. Appl. No. 11/023,602, dated May 20, 2010, 6 pages.

Office Action issued in U.S. Appl. No. 11/023,617 dated Aug. 4, 2010, 7 pages.

U.S. Office Action mailed Feb. 16, 2007 in U.S. Appl. No. 11/023,602.

U.S. Final Office Action mailed Feb. 13, 2009 in U.S. Appl. No. 11/023,617.

U.S. Office Action mailed Jan. 10, 2011 in U.S. Appl. No. 11/023,614.

U.S. Office Action mailed Jan. 24, 2011 in U.S. Appl. No. 11/023,617.

Notice of Rejection mailed Oct. 22, 2010, in Japanese Patent Application No. 2004-381102, with English translation.

Notice of Rejection mailed Oct. 22, 2010, in Japanese Patent Application No. 2005-192933, with English translation.

Notice from the European Patent Office dated Oct. 1, 2007 concerning business methods, Official Journal EPO, XP007905525, Nov. 2007, 2 pages.

Notice of Allowance from Japan Patent Office mailed Oct. 23, 2009, for Japanese Patent Application No. 2004-381103.

Response filed Apr. 20, 2009 in Japanese Application No. 2004-381103, no English translation available.

Notice of Rejection mailed on Jan. 20, 2009, in Japanese Patent Application No. 2004-381104.

Official Notice of Final Rejection mailed on Mar. 13, 2009, in Japanese Patent Application No. 2004-381104.

Response filed Feb. 18, 2009, in Japanese Patent Application No. 2004-381104.

Official Notice of Rejection mailed on Nov. 18, 2008, in Japanese Patent Application No. 2004-381104.

The People's Republic of China Notice on the First Office Action dispatched Oct. 27, 2010, in Application No. 200680018489.9.

The People's Republic of China Notice on the First Office Action dispatched Mar. 20, 2009, in Application No. 200680024080.8.

European Communication and Extended Search Report dated Jul. 21, 2009, in Application No. 067859603.

Response to Non-Final Office Action mailed Apr. 2, 2010, filed Jul. 2, 2010 in U.S. Appl. No. 11/917,673.

Response to Final Office Action mailed Sep. 8, 2010, filed Dec. 8, 2010 in U.S. Appl. No. 11/917,673.

Response to Non-Final Office Action mailed Nov. 6, 2006, filed Feb. 6, 2007 in U.S. Appl. No. 11/023,612.

Response to Non-Final Office Action mailed Apr. 19, 2007, filed Jul. 19, 2007 in U.S. Appl. No. 11/023,612.

Response to Final Office Action mailed Sep. 25, 2007, filed Jan. 24, 2008 in U.S. Appl. No. 11/023,612.

Notice of Allowance mailed Feb. 13, 2008, in U.S. Appl. No. 11/023,612.

Response to Non-Final Office Action mailed May 13, 2008, filed Nov. 12, 2008 in U.S. Appl. No. 11/023,617.

Response to Final Office Action mailed Feb. 13, 2009, filed May 13, 2009 in U.S. Appl. No. 11/023,617.

Response to Non-Final Office Action mailed Jun. 8, 2009, filed Sep. 8, 2009 in U.S. Appl. No. 11/023,617.

Response to Final Office Action mailed Jan. 27, 2010, filed Jul. 26, 2010 in U.S. Appl. No. 11/023,617.

Response to Non-Final Office Action mailed Aug. 4, 2010, filed Nov. 4, 2010 in U.S. Appl. No. 11/023,617.

Response to Non-Final Office Action mailed Feb. 6, 2006, filed May 4, 2006 in U.S. Appl. No. 11/023,602.

Response to Final Office Action mailed Jul. 24, 2006, filed Sep. 15, 2006 in U.S. Appl. No. 11/023,602.

Advisory Office Action mailed Oct. 2, 2006, in U.S. Appl. No. 11/023,602.

Response to Advisory Action mailed Oct. 2, 2006, filed Nov. 30, 2006 in U.S. Appl. No. 11/023,602.

Response to Non-Final Office Action mailed Dec. 19, 2007, filed Jun. 19, 2008 in U.S. Appl. No. 11/023,602.

Notice of Allowance mailed Oct. 20, 2008, in U.S. Appl. No. 11/023,602.

Notice of Allowance mailed Jan. 26, 2009 in U.S. Appl. No. 11/023,602.

Response to Non-Final Office Action mailed Sep. 4, 2009, filed Dec. 4, 2009 in U.S. Appl. No. 11/023,602.

Response to Final Office Action mailed Jan. 6, 2010, filed Apr. 5, 2010 in U.S. Appl. No. 11/023,602.

Notice of Allowance mailed May 20, 2010 in U.S. Appl. No. 11/023,602.

Response to Non-Final Office Action mailed Oct. 26, 2007, filed Mar. 26, 2008 in U.S. Appl. No. 11/023,614.

Response to Final Office Action mailed Jun. 16, 2008, filed Dec. 16, 2008 in U.S. Appl. No. 11/023,614.

Response to Non-Final Office Action mailed Jan. 21, 2009, filed May 21, 2009 in U.S. Appl. No. 11/023,614.

Response to Final Office Action mailed Aug. 7, 2009, filed Nov. 9, 2009 in U.S. Appl. No. 11/023,614.

Response to Non-Final Office Action mailed Dec. 15, 2009, filed Mar. 15, 2010 in U.S. Appl. No. 11/023,614.

Response to Final Office Action mailed May 19, 2010, filed Nov. 10, 2010 in U.S. Appl. No. 11/023,614.

Response to Non-Final Office Action mailed Apr. 7, 2008, filed Sep. 8, 2008 in U.S. Appl. No. 11/159,838.

Response to Non-Final Office Action mailed Mar. 24, 2009, filed Jul. 24, 2009 in U.S. Appl. No. 11/159,840.

Response to Final Office Action mailed Oct. 15, 2009, filed Jan. 14, 2010 in U.S. Appl. No. 11/159,840.

Response to Non-Final Office Action mailed Mar. 15, 2010, filed Jun. 15, 2010 in U.S. Appl. No. 11/159,840.

Response to Final Office Action mailed Jul. 7, 2010, filed Nov. 8, 2010 in U.S. Appl. No. 11/159,840.

Notice of Allowance mailed Dec. 28, 2010 in U.S. Appl. No. 11/917,673.

Japanese Office Action mailed Feb. 15, 2011, cited in Application No. 2004-381102.

Notice of Allowance mailed Mar. 31, 2011 in U.S. Appl. No. 11/917,673.

Japanese Notice of Rejection mailed on Apr. 28, 2011 in Japanese Patent Application No. 2008-518157.

Learn the Basics, Course on Use of PC, Vol. 5, -Electronic Mail-, Nikkei Business Publications, Inc., Japan, Aug. 1, 1998, pp. 94-106.

* cited by examiner

| Picture Positions | Template | Example Cards 460 | | | |
|---|---|---|---|---|---|
| Left 410 | Picture | | | | |
| Right 420 | Picture | | | | |
| Top 430 | Picture | | | | |
| Bottom 440 | Picture | | | | |
| No Image 450 | | | | | |

*Fig. 4*

SENDING AND RECEIVING ELECTRONIC BUSINESS CARDS

BACKGROUND

A common method of exchanging personal and/or business contact information from one person to another is through the exchange of physical printed business cards. Often, a given person may give and/or receive tens or even hundreds of printed business cards over the course of a given period of time. Upon receipt of a printed business card, the card recipient often desires to store the data from the card via an electronic contacts application. Unfortunately, storing the data via the electronic contacts application typically requires entry of the data by hand. Similarly, if the recipient already has contact information associated with a received business card, the recipient has no automated means for updating the contact information with new information received on the business card. Electronic card readers have been developed for storing a scanned image of a printed business card, but such readers do not allow for storage of individual typed data fields of a given card, for example, name, telephone number, address, and the like, or metadata that provides information about which of such data fields are included in the card.

In addition, contacts applications users often desire to send contact information to a recipient via an electronic communication method, such as electronic mail, but the contact information must be entered into an electronic mail message by hand or by a copy and paste operation. Such methods are cumbersome and do not provide for a succinct visual presentation of the contact information as is the case with a physical printed business card. According to the vCard standard, electronic business cards may be sent over digital media, but vCards do not carry a graphical visual representation of the contact information as is the case with physical printed business cards. Thus, sending contact information electronically in such a manner does not provide the sender a means for branding himself/herself as is possible with business cards that present unique logos or formatting properties.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide for generating electronic business cards from electronic contact information that may be rendered and displayed as single electronic business cards or as a collection of electronic business cards. According to this embodiment, all electronic contact files stored in an electronic mail application contacts data repository have one associated "electronic business card", which is essentially a graphical presentation of the data in a business card format. Electronic business cards may be automatically generated by the electronic mail application according to one or more default templates, or electronic business cards may be customized manually by a user with unique logos, pictures, or other custom formatting properties. Electronic business cards may be structured according to a data structuring language, such as the Extensible Markup Language, and an associated schema file. Structured and schematized electronic business cards may be consumed by any application functionally capable of consuming data structured according to the data structuring language applied to the electronic business card.

Contact information may be sent over electronic communications media, such as electronic mail, in the form of electronic business cards. According to one embodiment, an electronic business card sent over digital media includes sending an image of the business card as it appears to the user, for example a JPEG, PNG, GIF, TIFF image, with an associated vCard that contains an encapsulated design of the electronic business card with the contact data such as name, phone numbers, addresses and any number of pictures, logos, background color or patterns that the business card may display. Alternatively, an electronic business card sent over digital media includes sending an image of the business card as it appears to the user in JPEG format and the vCard containing contact data such as name, phone numbers, addresses and any pictures, logos, background colors or patterns that the business card may display is embedded into the EXIF metadata of the JPEG image. Alternatively, the electronic business card may be sent as an OLE object with image and associated data.

Electronic business cards may also be shared over electronic communications media such as the Internet or the World Wide Web or through electronic media such as electronic mail systems. The electronic business cards that are exchanged over electronic communications media may be digitally signed for identification of a sender as well as for verifying the integrity of information that is sent from the sender.

Users may publish their business cards on their web sites, or organizations may publish one or more business cards for key contact persons in their web sites. These business cards can then be downloaded and opened by an electronic contacts application and stored locally for future use by the user from a contacts application. According to another embodiment, electronic business cards may be exchanged using shared computer folders, or shared locations identified by Uniform Resource Identifiers to which one or more computers may have access. Electronic business cards may be published to a shared location, such as a shared directory, as vCard files. Electronic contacts applications that have access to the shared directory can then choose to render the business card information in the vCard files when accessing or opening the information from the shared location.

When sending an electronic business card over electronic mail, an electronic mail application may provide the user with one or more business cards that represent the user's own information, such as name and telephone number, as an attachment to an electronic mail message. Alternatively, electronic business cards may be selected from a collection of electronic business cards from the user's electronic contacts repository for attachment to an electronic mail message. According to one embodiment, the first time an electronic business card sender designates contact information for sending to a recipient, an automatically generated electronic business card may be presented to the sender based on information contained about the sender, for example, name, title, address, telephone numbers, and the like maintained for the sender in the sender's electronic contacts repository. Such information about the sender/user may be also be picked by the electronic mail application from a corporate or other institutional directory based on the user's logon credentials into the corporate/institutional computer system. Alternatively, the sender may graphically pick electronic business cards from a collection of business cards for sending in an electronic mail message. In addition, a thumbnail representation of an electronic business card may be added to an electronic signature of an electronic mail message.

When selecting to send electronic business cards, the user may be able to quickly access them according to various lists, for example, a most recently sent business cards list may be presented to the user from the electronic mail form. In addition, electronic business cards may be added to an electronic mail signature in a thumbnail format so that users are able to easily exchange their own contact information in all the emails that they send. Additionally, a smart tag designation may be presented when a user enters information in an electronic mail message that is present in an associated contact file for allowing the user to substitute textual information, such as telephone numbers, with an electronic business card associated with the textual information.

Visual representations of electronic business cards received via electronic mail messages may be viewed in an electronic mail message body. Received electronic business cards may be added to the user's electronic contacts repository from the message body of an electronic mail message or from an attachment. Duplicate electronic business cards may be resolved if the associated contacts information already exists in the recipient's electronic contacts repository. In addition, changes or updates to a contact file associated with a received electronic business card may be previewed before selecting to accept the associated changes.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 4 illustrates a number of electronic business card templates and associated example business cards.

DETAILED DESCRIPTION

Embodiments of the present invention are directed to generating electronic business cards and sending and receiving electronic business cards over digital media. According to embodiments of the present invention, electronic business cards are digital visual representations of an electronic contact file that is laid out in a printed business card format, backed by schematized contact data. Electronic business cards may be generated from contact information from one or more default templates followed by user customization, if desired. Electronic business cards may be automatically generated upon rendering of electronic contacts data including sending an automatically generated business card through electronic mail messages. Electronic business cards and associated images may be sent to and received by recipients over various types of digital media.

Recipients of electronic business cards may add received electronic business cards and associated contact information to their own contacts application files. If a received electronic business card provides updated information for an existing contact file, information from the received electronic business card may be used for updating the existing file. If the received electronic business card is a duplicate of an existing electronic business card, a method is presented for either updating the existing contact information or for creating a new copy of the received information.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
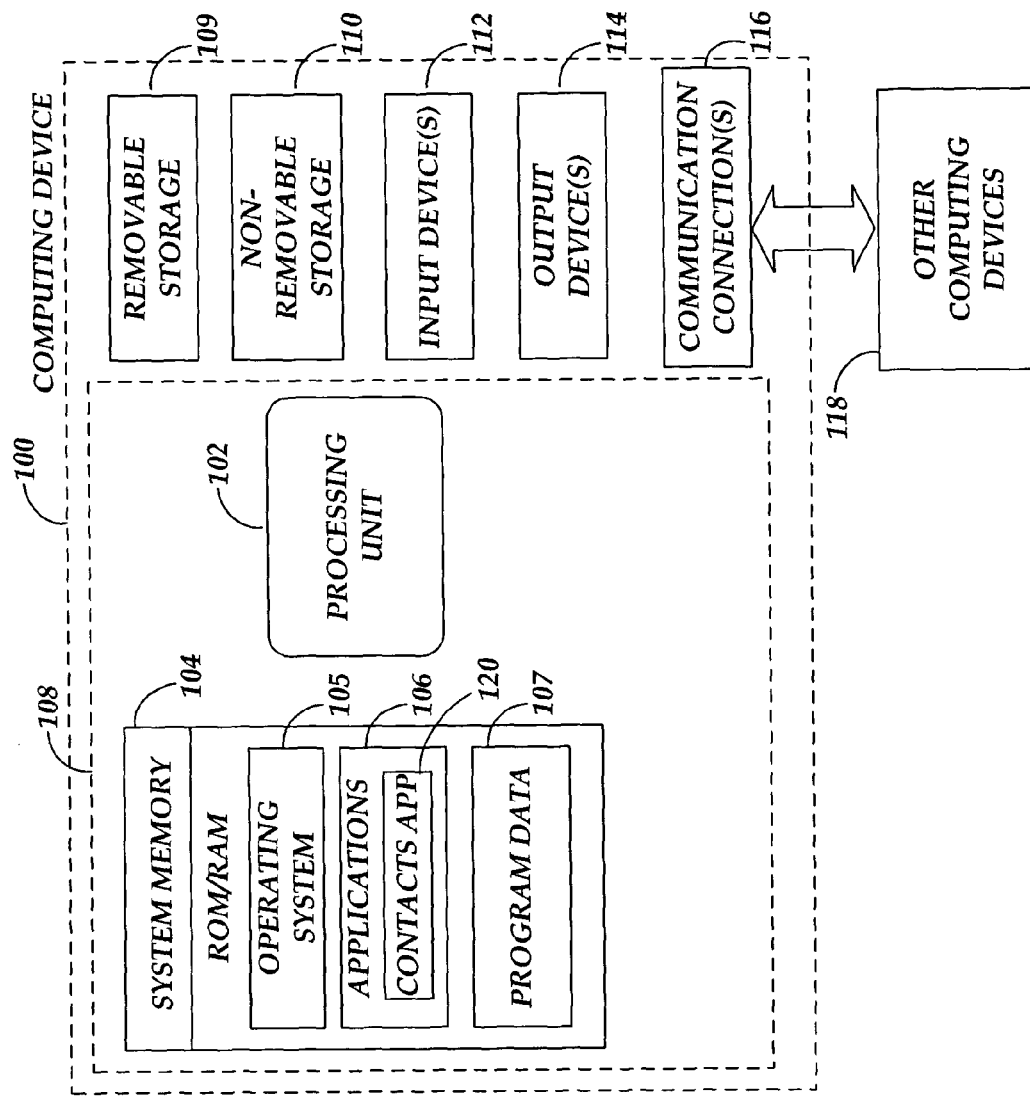
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

In one embodiment, the application 106 may comprise many types of programs, such as a word processing application program, a spreadsheet application, a desktop publishing, and the like. According to an embodiment of the present invention, the application program 106 comprises a multiple-functionality software application for providing a user calendaring functionality, electronic mail functionality, contacts storage and management functionality, electronic notes functionality, electronic journal functionality and the like. Some of the individual program modules comprising such a multiple-functionality program 106 include an electronic mail program, a contacts application 120, a calendaring module, a tasks module, a notes module and a journal module. An example of such a multiple-functionality program 106 is OUTLOOK® manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Electronic Business Card Creation and Rendering

Figure 2:
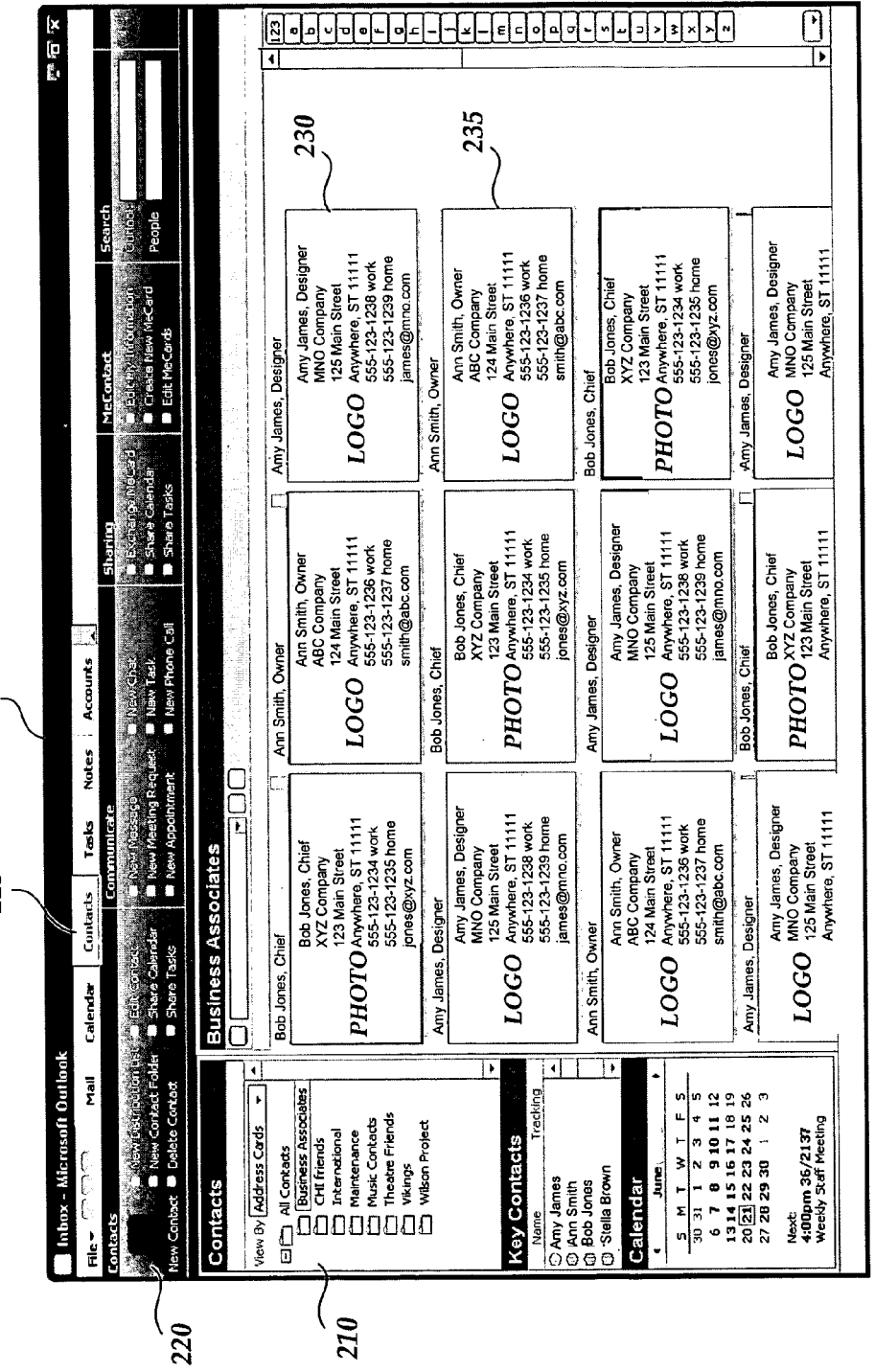
FIG. 2 illustrates a computer screen display of an electronic contacts application user interface showing a number of electronic business cards.

Referring now to FIG. 2, a graphical user interface 200 of an electronic contacts application 120 is presented. As should be appreciated by those skilled in the art, the user interface 200, illustrated in FIG. 2, and all other user interfaces, illustrated herein, are for purposes of example only and are not limiting of the variety of different user interface layouts and designs that may be used according to embodiments of the present invention. The user interface 200 includes software application functionality buttons along an upper edge, including the "contacts" button 215. Selection of one of the functionality buttons provides associated software functionality and associated user interfaces, such as electronic mail functionality, electronic calendar functionality, electronic contacts functionality, electronic tasks functionality, etc.

The user interface illustrated in FIG. 2 is associated with the functionality of an electronic contacts application 120 such as is found in OUTLOOK® manufactured by MICROSOFT CORPORATION. In an upper portion of the user interface 200 is a user interface component 220 (hereafter "UI component") in which is presented a variety of selectable functionalities associated with the application in use, for example, the contacts application 120. On the left-hand side of the user interface, a navigation pane 210 is presented with which a user may navigate to different data and functionality associated with the application in use. For example, according to the electronic contacts application 120 and user interface 200, illustrated in FIG. 2, the navigation pane 210 displays an electronic contacts repository that includes one or more "contacts folders", for example, "all contacts," "business associates," "international," etc. According to embodiments of the present invention, the user may categorize his/her contact information according to one or more contacts folders for enhanced management of his/her electronic contacts repository. As described herein, an electronic contacts repository may contain one or more individual contact files organized into one or more storage folders for navigation by a user. Each contact file may contain contact data elements, for example, name, address, telephone number, facsimile number, electronic mail address, company or personal URL, logos, images, and the like, for a given person or institution. According to one embodiment, the contact data elements may be stored as schematized data according to an associated schema for the data elements.

According to embodiments of the present invention, and as will be described in detail herein, the view area of the user interface 200 shows a number of electronic business cards that have been previously generated, received or automatically generated by the electronic contacts application and that have been stored by the user in the user's electronic contacts repository. The user can choose different ways of viewing the electronic business cards presented in the user interface 200, as illustrated in FIG. 2. For example, the view can be arranged by sorting on the card name in an ascending or descending manner, or the view can be arranged by sorting on the company name in ascending or descending manner. The user also has the ability to shrink the cards to smaller sizes so that he or she can view more cards and pick a desired card, or conversely, the user can zoom into the view to see existing business cards in a larger and more readable form. The user also has the ability to quickly search the electronic business card that he or she is looking for by just entering any text that may be present in the business card, or by specifying the type of business card. For example, the user may be able to search for all the business cards of a contacts repository associated with a single company by entering the name of the company in the search.

The example electronic business cards 230, 235, illustrated in FIG. 2, are digital visual representations of electronic business cards stored in the user's "business associates" contacts folder. As should be appreciated, selection of a different contacts folder from the navigation pane 210 causes the presentation of electronic business cards associated with the selected contacts folder. According to embodiments, presentation of contact information associated with the illustrated electronic business cards may be selectively presented in a traditional contact file format where each data item, for example, name, title, address, telephone number, email address, URL etc., is presented in individual data files associated with a various contacts. However, presentation of the contacts information for individual contacts as individual electronic business cards is advantageous because the information is provided in a visually pleasing and potentially unique manner for each contact. Because each electronic business card may be backed by schematized data, electronic business cards may carry and may be rendered according to a variety of styles and formats and unique properties, such as font type, font size, font color, background color, background pattern etc, as well as, images, such as company logos, and contact photographs with associated formatting, such as alpha blending, transparency, fit to edge and other image transformations, which may be applied to individual electronic business cards.

Figure 3:
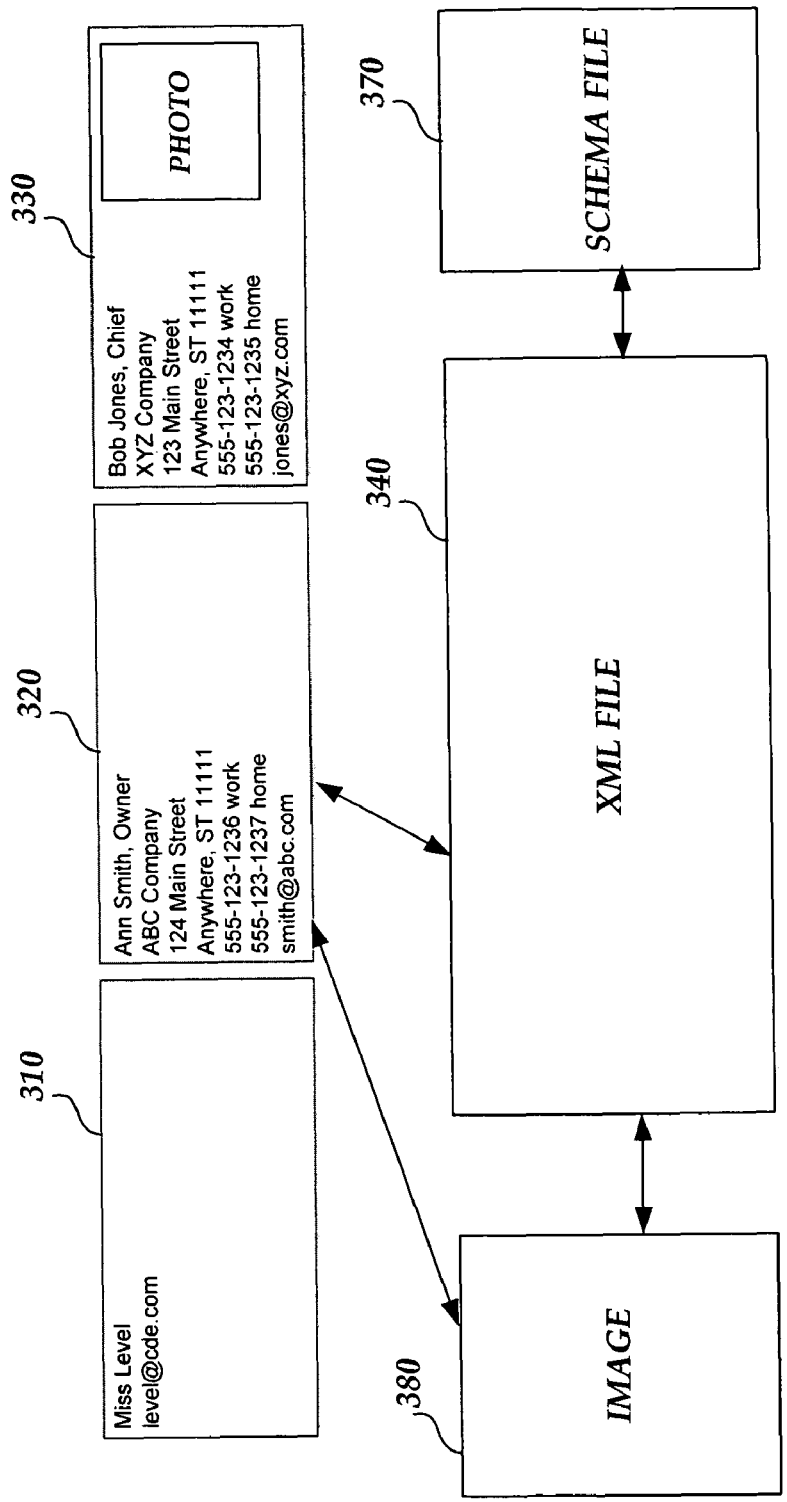
FIG. 3 illustrates electronic business card templates and an associated Extensible Markup Language file and schema file.

Referring now to FIGS. 3 and 4, electronic business cards may be generated by the electronic contacts application 120 by use of auto-generated default templates or by custom design. According to one embodiment, for any contact file for which no electronic business card has been generated, the electronic contacts application 120 will auto-generate an electronic business card using a default template 310, 320, 330, as illustrated in FIG. 3. For contact files without photographs (images) associated with the contact, a text-only template 310, 320 may be used. If a photograph or other image, such as a company logo, is available, the photograph template 330 may be used. For contacts that only have a company name instead of a person name, the business card may be generated using the company name highlighted as the name of the card.

As illustrated in FIG. 4, a variety of additional electronic business card templates may be provided for organizing contact information according to user-desired customized views. For example, the template 410 places a picture, logo, or other image on the left side and text and the right side. The template 420 places a picture, logo, or other image on the right side and text on the left side. The template 430 places a picture, logo, or other image on the top and text on the bottom, and so on. To the right of the example templates 410, 420, 430, 440, 450 are shown a number of example electronic business cards generated from the corresponding templates. As should be appreciated, the template layouts illustrated in FIGS. 3 and 4 are for purposes of example and are not limiting of the numerous layouts that may be used for generating electronic business cards. For example, a template layout may place an image in the middle of an electronic business card with text above and below the image. In addition, a number of other layout properties may be applied, such as borders on one or more sides, borders on all sides, and the like.

According to embodiments of the present invention, a user may use the electronic business cards auto-generated by the electronic contacts application 120, as described above. Or, individual electronic business cards may be customized using different template styles, discussed above with reference to FIG. 4, and by populating an associated contact file with unique images, such as logos, photographs, art images, and the like. In addition, the font size and text styles of text applied to a given electronic business card may be customized to allow a user to create an electronic business card that approximates a physical printed business.

According to another embodiment, a company, educational institution, profit or non-profit organization or any other entity may set up default electronic business cards for all employees and associates of the organization or entity. Such default business cards may be formatted according to a standard organization business card format with one or more unique logos or images (e.g., company photographs, artwork, etc.). The default cards may be structured such that individual data, for example, name, title, address, telephone number, etc. is populated for each employee in standard positions. Additionally, other attributes such as unique borders, background colors and font size/style may be applied. Each employee then may automatically generate and send to others an organization/company business card with his/her personal contact information populated into the organization/company business card just as he/she could exchange a paper organization/company business card.

Referring back to FIG. 3, according to embodiments of the present invention, electronic business cards may be structured according to a data structuring language, such as the self-describing data structuring language, Extensible Markup Language (XML). In FIG. 3, an XML data file 340 is illustrated as being associated with the electronic business card 320. According to an embodiment of the invention, each structural element (e.g., XML elements) applied to the electronic business card may be linked to corresponding data fields in associated contact files to allow generation of electronic business cards by populating the cards with data from associated contact files. For example, the structural elements in the data file 340 are linked to a contact file for the subject "Ann Smith." When the electronic business card 320 is generated for the contact file for "Ann Smith" data from appropriate fields in the "Ann Smith" contact file is extracted from the contact file and is used to generate the electronic business card according to the structural framework established for the electronic business card according to a structured data file, such as an XML data file 340. As should be appreciated, other data structuring languages, such as HTML and the vCard standard, may be utilized for generation of the electronic business cards described herein.

As should be appreciated, the XML data file 340 does not show actual XML data. The XML data file 340 is for purposes of illustration only. Additionally, the XML data file 340 does not show formatting information for the associated electronic business card 320. The following sample XML file shows formatting information that may be applied to an electronic business card 320 for showing the layout and formatting of the electronic business card. It also should be appreciated that the following sample XML file only includes formatting data and does not include actual values of included properties.

```
<businesscardformat>
    <layout>{number or ID that specifies the layout, for example,
       where to
put the image, or other defaults such as background image or pattern
that go with the layout by default}
    </layout>
    <image>
        <selection>{specify one of two values to use: photo or
           logo}
        </selection>
        <dimension>{specify size of image and position} </dimension>
        <attributes>{specify alignment such asstretch, fit to edge etc}
        </attributes>
    </image>
    <background>
        <image>{specify background image or pattern to be used in the
           card}
        </image>
        <color> {specify background color}</color>
    </background>
    <text font="Tahoma; bold" size="14" property="fullname" />
    <text font="Tahoma; bold" size="8" property="businessphone"
            color="red">
        <label font="Tahoma; bold" size=8 color="blue"
              charset="1033">Home</label>
    </text>
</businesscardformat>
```

Referring still to FIG. 3, the data file 340 associates the data structure of the data file 340 with a schema file 370. As is appreciated by those skilled in the art, the schema file 370 provides the grammatical and syntax rules for the XML structure 340 applied to the associated electronic business card template and card 320. For example, if the schema file 370 requires that the contact name must include both a first name and last name, then data entered into the associated contact file and electronic business card must be of the form first name and last name in order to be valid according to the schema file 370. Thus, the schema file 370 allows for control over amounts of and types of data that may be populated into an associated electronic business card, and the schema file 370 ensures that the data structure applied to an associated electronic business card is valid.

The structuring and schematization of each electronic business card, as described above, allows each electronic business card to be consumed and rendered by subsequent consuming applications, for example, electronic mail applications, contacts applications, card reader applications, word processing applications, spreadsheet applications, mail merge and mass mailing applications, instant messaging applications, cell phones, applications on personal digital assistants (PDA), integrated cell phone/personal digital assistants, etc. That is, any application that is capable of consuming the structured data file 340 (e.g., XML capable application) in accordance with the associated schema file 370, may render, display, and otherwise utilize data from the electronic business card. For example, as will be described below, an electronic mail application may render and display an associated electronic business card in the body of an electronic mail message, or a contacts application may extract data, for example, a name and address of a given contact, from an electronic business card based on the structure of the electronic business card for adding the extracted information to a contact file or for updating information contained in an existing contact file.

According to another embodiment, another consumer of electronic business cards includes a printing function or module. According to this embodiment, one or more selected electronic business cards may be printed for generating physical business cards. For example, a selected paper stock may be utilized for generating high quality paper business cards by printing to the paper one or more desired electronic business cards.

Referring still to FIG. 3, in addition to generating an electronic business card from associated contacts information, a graphical visual representation of a generated electronic business card is generated that may be displayed to a user in a variety of contexts, as described herein. According to embodiments of the present invention, an image 380 is generated for each electronic business card for capturing and allowing display of the visual representation of each electronic business card. According to embodiments of the present invention, the image 380 may be in any suitable format for generating, sending and receiving images, for example, JPEG (Joint Photographic Experts Group) images, PNG (portable network graphics) images, GIF (graphical interchange format) images, TIFF (tagged image file format) images, bitmap images, and the like. As described below, when exchanging electronic business cards over digital media, the image 380 for a given electronic business card may be associated with the schematized data structure 340 for the card to allow consuming applications to both display the card as a visual representation and to access and utilized data represented in the card.

Sending and Receiving Electronic Business Cards

Figure 5:
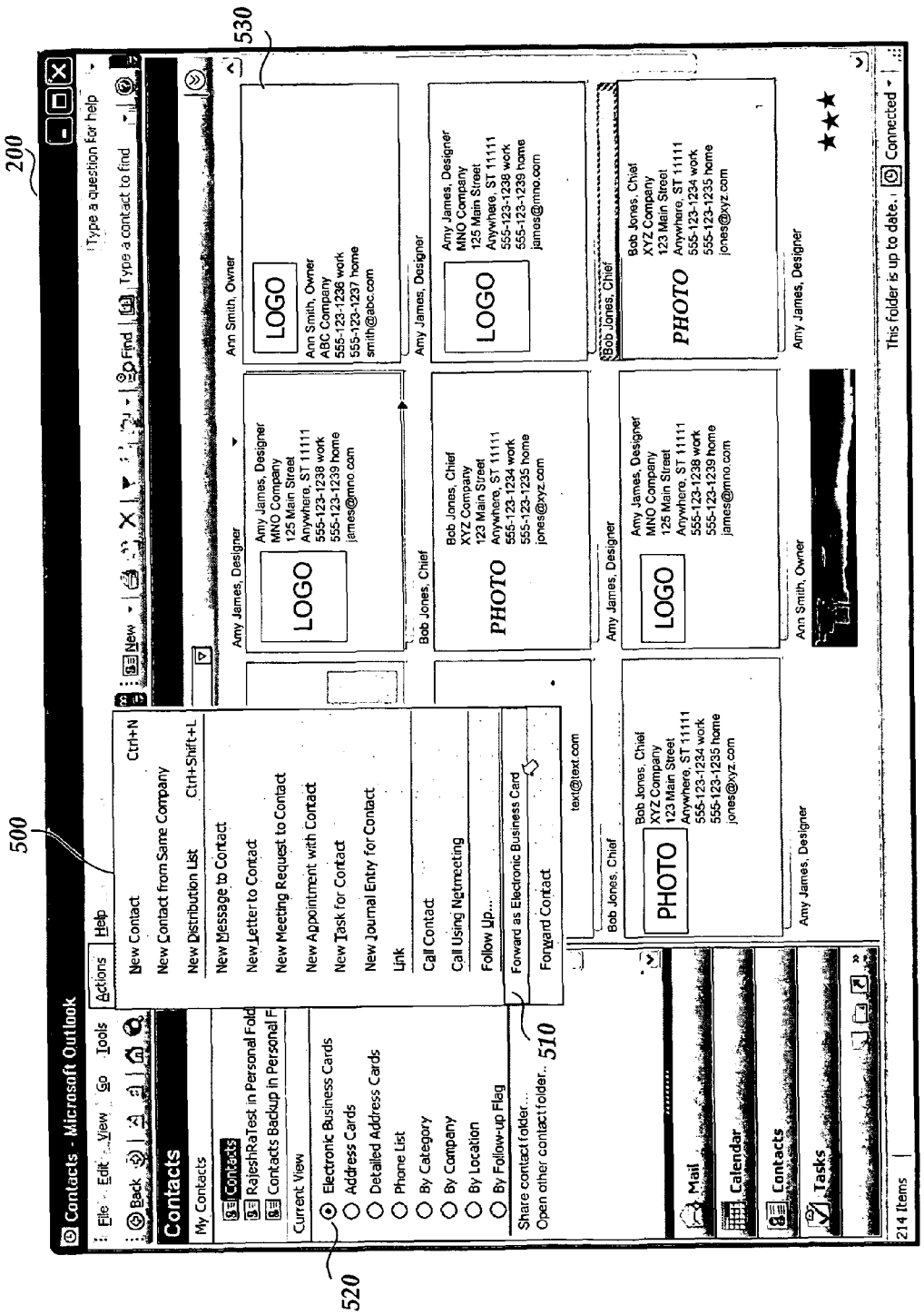
FIG. 5 illustrates a computer screen display of an electronic contacts application user interface showing a deployed actions menu.

According to embodiments of the present invention, electronic business cards may be sent to other users as objects inserted in an electronic mail message. Referring to FIG. 5, sending an electronic business card from an electronic contacts application user interface 200 is illustrated. As illustrated in FIG. 5, the user has selected an "electronic business cards" function for populating the display area of the user interface 200 with electronic business cards maintained by the user. According to embodiments, in order to edit or send a given electronic business card, for example, the electronic business card 530, the user selects and highlights the desired electronic business card. Once an electronic business card 530 has been selected, the user may take a number of actions on the selected electronic business card, including editing the electronic business card, deleting the electronic business card, moving the electronic business card to a different folder, etc.

According to other embodiments, the user can also take other actions, such as shrinking all the business cards in a view to be able to see more business cards in the view, or increasing the size of the business cards in the view so as to be able to see larger text in the cards for increasing readability. The user may also decide to select a variety of other transformations on the business cards. For example, the user may choose to view only those business cards that have been received by the medium of email, or the user may choose to view only those business cards that have a text only design or only those business cards that have a certain formatting characteristic, such as a particular background color.

According to this embodiment, if the user desires to forward (send) the associated contact information to a destination address as an electronic business card, as illustrated in FIG. 5, a drop-down "actions" menu is selected, and a "forward as electronic business card" function is selected for sending the selected electronic business card to an intended recipient. As should be appreciated, more than one electronic business card may be sent. That is, a number of contacts data items may be selected and forwarded or sent as electronic business cards during any given transmission.

Figure 6:
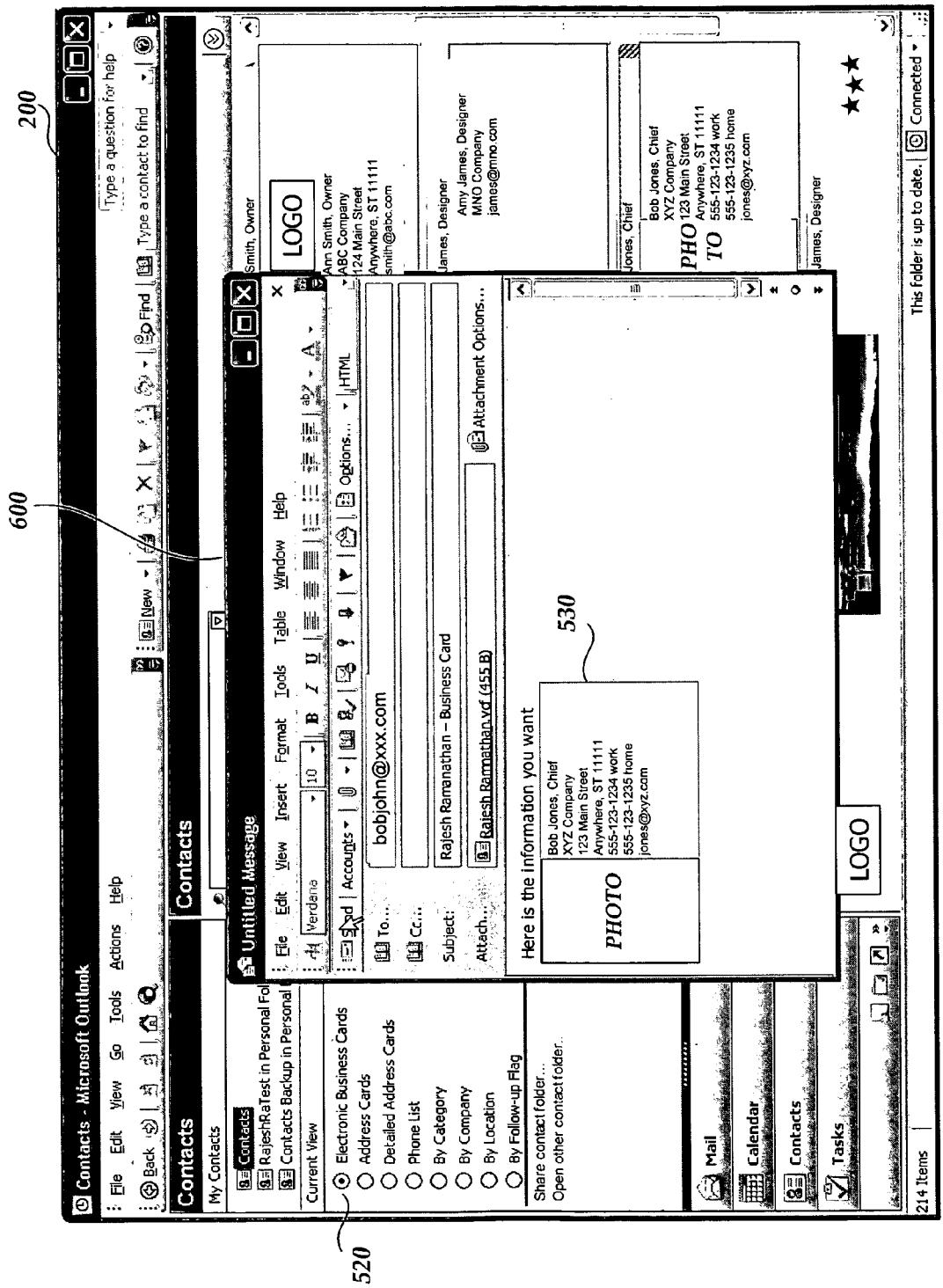
FIG. 6 illustrates a computer screen display of an electronic contacts application user interface showing a deployed electronic mail user interface for forwarding an electronic business card to a destination address.

Referring now to FIG. 6, in response to selecting the "forward as electronic business card" function, an electronic mail message user interface 600 is displayed, and the selected electronic business card is rendered and displayed in the body of the electronic mail message 600. As described above, the electronic mail application responsible for the electronic mail message 600 renders and displays the electronic business card 530 in the message 600 based on the image 380 and schematized structure 340 applied to the electronic business card 530. Once the electronic business card 530 is inserted into the message 600, the sender may populate the message 600 with an appropriate electronic mail destination address of the recipient and transmit the message along with the inserted electronic business card.

Figure 7:
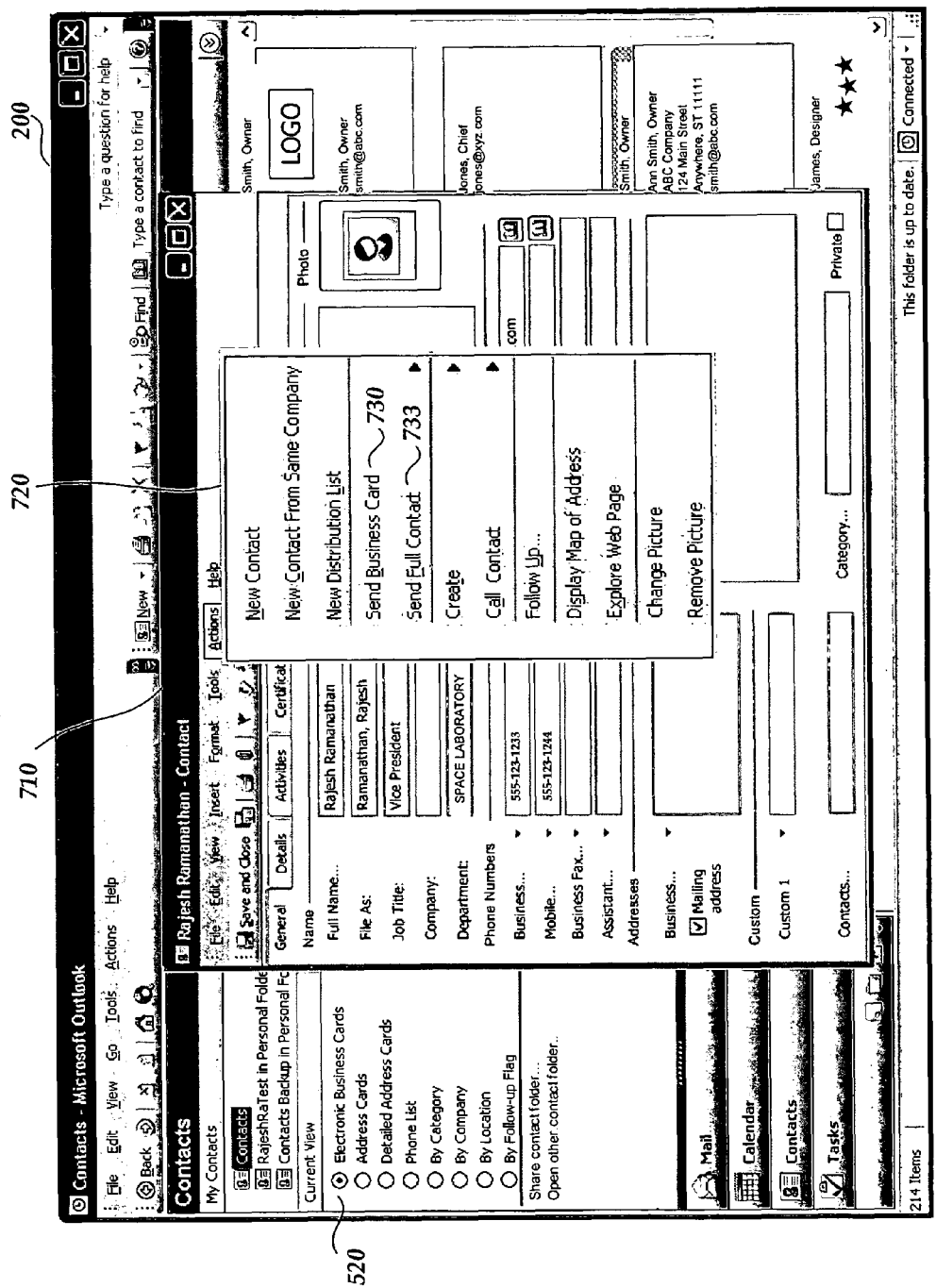
FIG. 7 illustrates a computer screen display of an electronic contacts application user interface for forwarding an electronic business card from a contacts user interface.

Referring now to FIG. 7, sending one or more electronic business cards via an electronic contacts dialog is illustrated. An electronic contacts dialog 710 is displayed showing detailed contact information for a given contact file. If the user desires to send the contact information contained in the contacts dialog 710 to a recipient, the drop-down "actions" menu 720 is deployed in the contacts dialog 710. Selection of the "send business card" function 730 causes an electronic message 600 to be populated with an associated electronic business card, as illustrated above in FIG. 6. If no electronic business card has been previously generated and stored for the associated contact information, the electronic contacts application will automatically generate an electronic business card from a default template, as described above with reference to FIGS. 3 and 4. The automatically generated electronic business card will then be inserted into the electronic mail message 600, as illustrated and described above with reference to FIG. 6. The sending party may then populate the electronic mail message with an appropriate electronic mail destination address and transmit the message along with the electronic business card.

In addition, a "send full contact" function 733 is shown in the menu 720. As should be appreciated, a given electronic business card may include only a subset of the contacts data elements contained in a given contact file, which typically matches what is visible in the business card design. Using the "send full contact" function 733, all information in a given contact file may be sent to a recipient. As should be understood, using the "send full contact" function may include sending an electronic business card associated with the selected contact file along with other information contained in the contact file that is not contained in the electronic business card.

Figure 8:
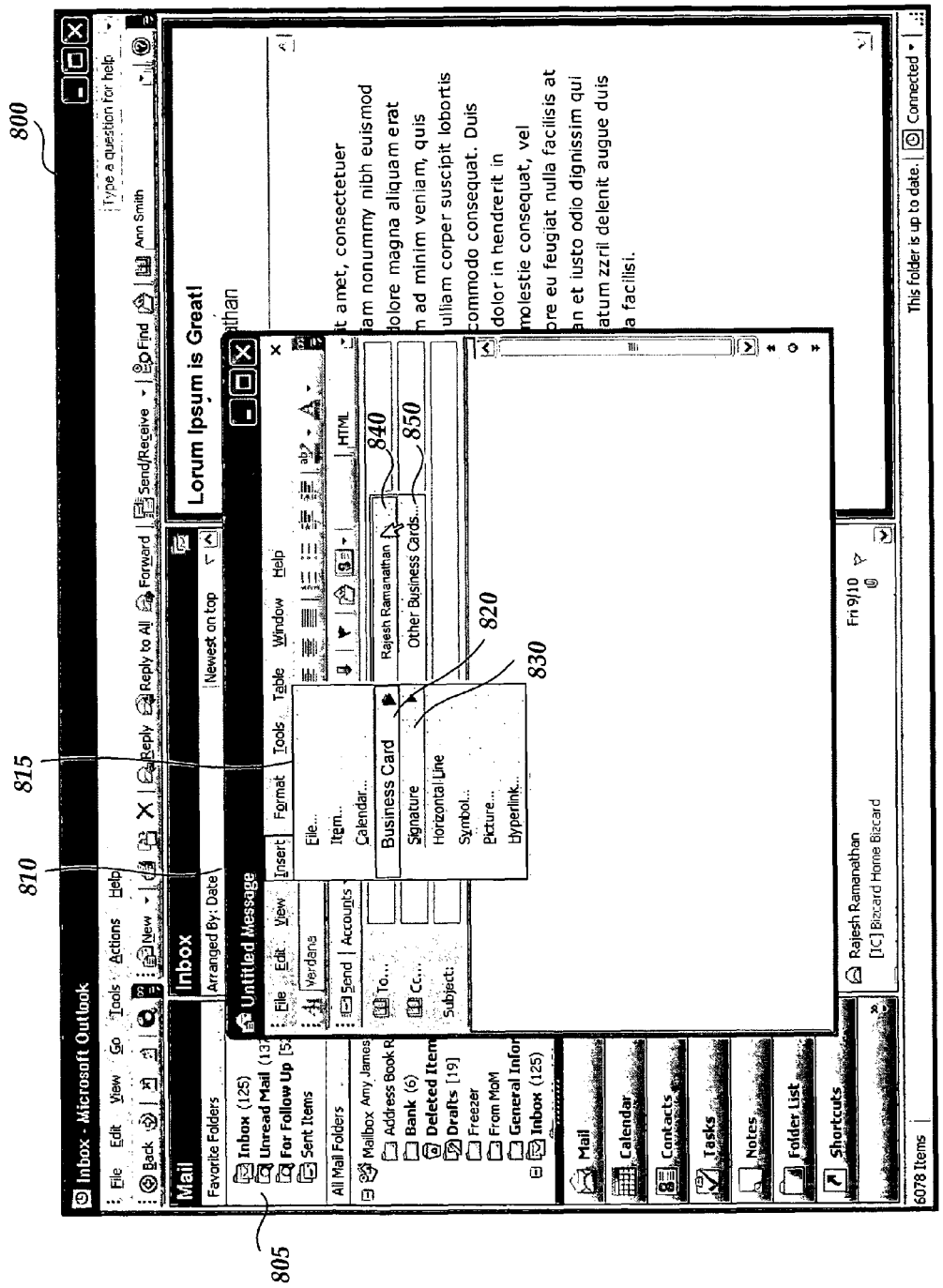
FIG. 8 illustrates a computer screen display of an electronic mail application user interface for forwarding an electronic business card.

Referring now to FIG. 8, sending one or more electronic business cards via an electronic mail application is illustrated. An electronic mail message 810 is illustrated for sending electronic mail to a recipient. Electronic mail may be entered by the sender as typed textual information, or objects of various types, for example, pictures, symbols, electronic signatures, and the like, may be inserted. According to embodiments of the invention, electronic business cards may be inserted into the body of the electronic mail message for sending to a destination address. From the drop-down "Insert" menu, a "business card" function 820 is selected for inserting an electronic business card into the body of the electronic mail message 810. According to embodiments of the present invention, selection of the business card function 820 causes a pop-out menu which allows selection of the primary user business card 840 or business cards that were most recently exchanged by the user, or allows selection of other business cards stored by the user via the user's electronic contacts application 120, as described above.

Selection of the "other business cards" control may cause the display of a collection of selectable business cards, as illustrated above in FIG. 2, from which the user may select one or more desired cards for inserting into an electronic mail message. Additionally, selection of either the primary user business card function 840 or the "other business cards" function 850 may allow a user to send a standard organization/company business card generated by her organization/company for providing her personal contact information via an organization/company business card or for sending organization/company business cards of other employees or persons having organization/company business cards available through the "other business cards" function.

According to other embodiments of the invention, in addition to the primary user electronic business card or "other business cards" category, other business cards may be presented in the pop-up menu 840. For example, a "most recently sent" list of electronic business cards may be created for listing a number of electronic business cards sent within a prescribed period of time. For example, the pop-out menu illustrated in FIG. 8 may be populated with the names of other selectable categories such as "most recently sent." As should be appreciated, selection of a control from the pop out menu associated with a category, such as "most recently sent," may cause a list of contacts associated with the "most recently sent" category from which the user may select a desired electronic business card for sending via an electronic mail message. As should be appreciated, other electronic business card categories may be automatically generated or manually generated by the user such as "most recently received," "friends and relatives," "work associates," "school associates," and the like.

Figure 9:
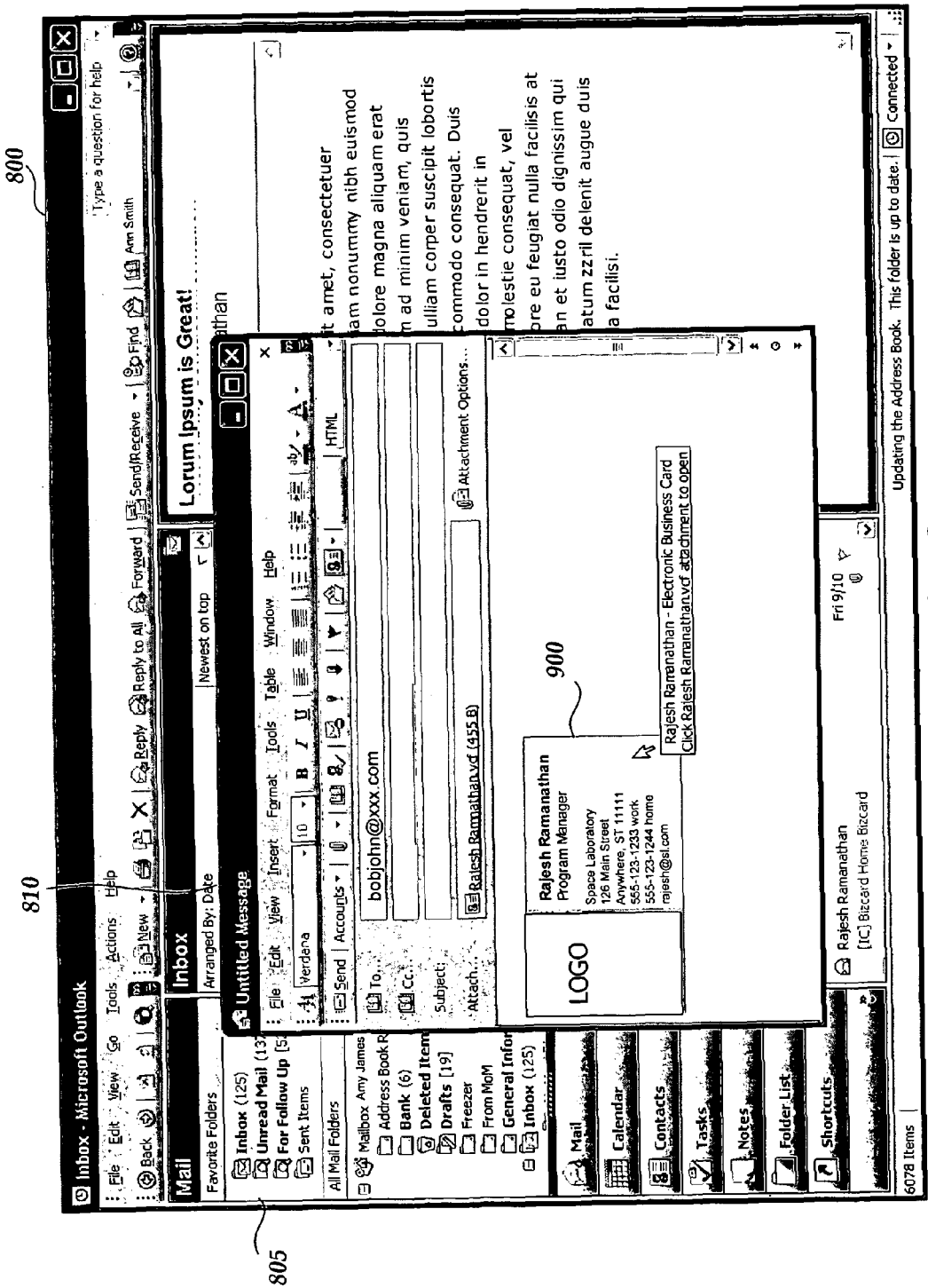
FIG. 9 illustrates a computer screen display of an electronic mail application user interface for forwarding an electronic business card to a destination address.

Referring now to FIG. 9, upon selection of a given electronic business card for inserting into the message 810, an associated electronic business card 900 is rendered by an electronic mail application into the body of the electronic mail message 810. The electronic business card 900 rendered and displayed in the electronic mail message 810 may be rendered from an existing electronic business card stored in the user's electronic contacts application, or the electronic business card 900 may be automatically generated if no electronic business card has previously been generated for the associated contact. As described above, once the desired electronic business card has been inserted into the electronic mail message 810, the electronic mail message 810 may be addressed and sent to an intended recipient.

Figure 10:
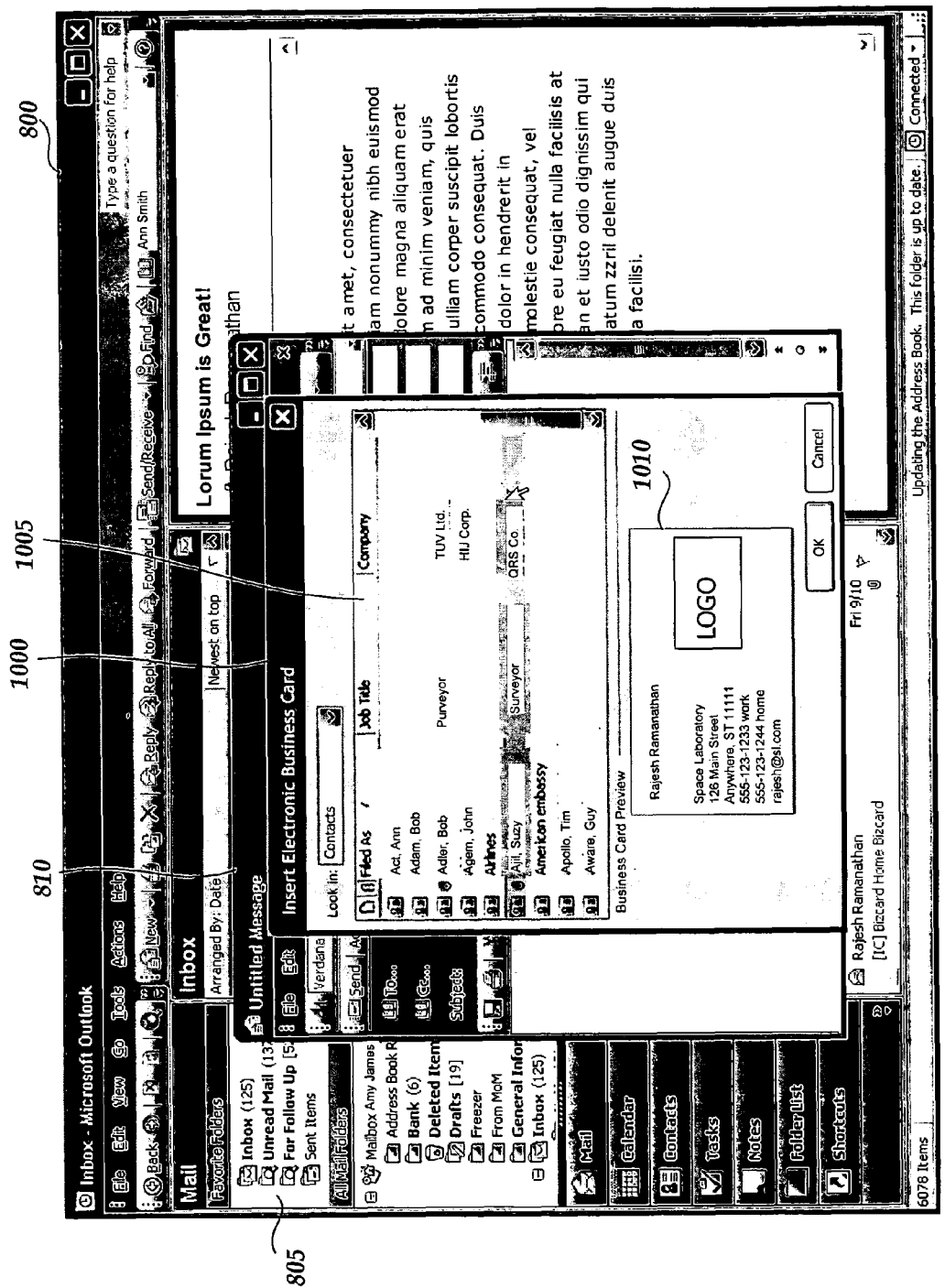
FIG. 10 illustrates a computer screen display of an electronic mail application user interface for selecting an electronic business card for forwarding to a destination address.

Referring to FIG. 10, according to one embodiment, if the electronic mail sender selects the "other business cards" function 850, an "insert electronic business card" dialog 1000 may be displayed. The dialog 1000 provides the electronic mail sender access to different electronic business card repositories, for example, the sender's personal electronic contacts repository. In the upper portion of the dialog 1005 is a listing of contacts information associated with individual contacts stored by the electronic mail sender. Upon highlighting an individual contact, a preview of an associated electronic business card 1010 is displayed in the lower half of the dialog 1000. The business card preview 1010 serves as a preview of the electronic business card that will be transmitted to an intended recipient if it is selected for sending to the recipient. According to embodiments of the invention more than one electronic business card may be sent to a receiving party. That is, the sending party may select a number of electronic business cards from her contacts repository for sending to various recipients. One or more cards may be selected from a dialog 1000, illustrated in FIG. 10, or a number of cards may be selected from a display of electronic business card images, as illustrated in FIG. 2 above.

The electronic business card 1010 presented as a preview shows the presently stored electronic business card for the selected contact. If no electronic business card has been generated for the selected contact, an electronic business card is automatically generated, as described above with reference to FIGS. 3 and 4, for providing a business card preview 1010. If the sender accepts the business card presented in the business card preview, the associated electronic business card is inserted into the electronic mail message 810 as illustrated above in FIG. 9. The electronic mail sender then populates the electronic mail message with appropriate destination address information and transmits the electronic mail message along with the inserted electronic business card.

According to an embodiment of the invention, electronic business cards may be inserted into an electronic mail message by substituting entered textual contact information with an associated electronic business card. According to this embodiment, the electronic mail application is equipped with a "smart tags" module for detecting textual contact information entered into an electronic mail message and for associating the textual contact information with an electronic business card stored in the sender's electronic contacts repository. According to this embodiment, as textual information is entered into a message entry area of the user interface 810, portions of the entered text, for example, words, sentences, paragraphs, or a prescribed number of entered characters, are sent to a recognizer module. According to this embodiment, the recognizer module is a software module, such as a dynamically-linked library (DLL), having sufficient computer-executable instructions for comparing received text with a list or database of information for matching entries.

When the recognizer module receives a portion of text, the portion of text is broken into individual words, numbers, and number/text combinations (e.g., names, telephone numbers, addresses, etc.). For example, a continuous text string located between two spaces may be recognized as a word. For another example, a five-digit number following a word may be recognized as a zip code. For another example, a 10-digit number string may be recognized as a telephone number. Once the text string passed to the recognizer module is parsed into text units, such as words, numbers, and/or number/word combinations, the text units are compared against the user's electronic contacts repository for matches. If a match is found, for example, a parsed word matches a name in the user's contacts repository, or a parsed number string matches a telephone number in the user's contacts repository, the word or number string being entered into the electronic mail message entry area may be automatically highlighted to the user (e.g., underlining).

If the user selects the highlighted word or number string, a pop-up dialog may be presented to offer the insertion of an electronic business card for the matching contact file. For example, if the user types "the following is the contact information for my friend, John Smith," the name "John Smith" may be recognized as associated with a contact file for a person named "John Smith." In accordance with this embodiment, the name "John Smith" will be recognized and highlighted. Upon selection of the highlighted name, the pop-up dialog may offer a selectable action for inserting an electronic business card for "John Smith." If the user selects the insertion of the electronic business card for John Smith, then the electronic business card will be dynamically inserted into the electronic mail message entry area. Thus, the user does not have to type the contact information manually.

As described above, once an electronic business card is selected, it may be transmitted electronically to a desired recipient. One method of sending electronic business card information over digital media to recipients is via the use of a vCard, which is an Internet standard for sharing virtual business card information over digital media. As understood by those skilled in the art, vCards may be used for transmitting structured data associated with a contact file over digital media, for example, electronic mail. For more information on vCard creation and use, see RFC2425 and RFC2426 promulgated by the Internet Mail Consortium. However, because the vCard standard does not allow for exchanging the auto-generated or custom generated visual presentations of electronic business card designs, as illustrated above in FIGS. 3 and 4, embodiments of the present invention provide for an improvement on the vCard standard for allowing for the exchange of electronic business card designs over digital media.

According to one embodiment of the present invention, electronic business cards are exchanged over digital media by sending a vCard that contains all the information, such as associated data, pictures and formatting information required to render the business cards in the receiving electronic contacts application. A graphical view of the business card is additionally sent as an image, for example, a JPEG image, a PNG image, a GIF image, a TIFF image, and the like. The image allows the receiving user to clearly identify that an electronic business card has been sent and allows a method of quickly receiving the attached vCard from the image itself by using means such as right clicking the received image or by showing a halo 1535 (illustrated in FIG. 15 below) on the received image. Additionally, the image allows previous versions of applications and/or applications that cannot read the business card design, described herein, to display the card as an image in email message bodies and to continue to use the other structured data in the vCard such as name and phone number for storing in the electronic contacts repository.

Referring back to FIG. 3, the image 380 represents the graphical visual presentation of the electronic business card, and the associated vCard contains the schematized contact information and data structure file 340 used for populating the electronic business card with data such as name, address, telephone number, as well as, design and other formatting preferences used for regenerating the business card image by the destination application. By including the design and other formatting preferences with the vCard for the selected electronic business card, the vCard standard is extended for allowing the electronic business card's design to be exchanged over digital media so that the design may be regenerated in the destination system. Being able to regenerate the design is advantageous because it allows the destination system to display the business card even if information in the associated contacts data changes. For example, if the destination system receives an electronic business card, and the destination user modifies the phone number in the contacts data after receiving the business card, then the destination system will display the electronic business card with the modified phone number information.

According to this embodiment, when an electronic business card is sent over digital media, the electronic business card will include a vCard file (.VCF file), which is essentially a text file. The vCard file will also include a display definition of the electronic business card as a vCard schema extension, for example, in the form "X-MS-OL-DESIGN." According to one embodiment, the display definition is a portion of binary information that contains information about a display of the card. For example, the display definition may contain information about what properties are included in the business card, such as name and telephone number, and what label to use with these properties (such as displaying "home" before the home phone number). The display definition may include information about the order of such properties and what formatting is to be applied to those properties, for example, bold, italics, highlighting, font size and color, etc. Other information may include what picture or image to use, for example, a photograph or logo image with the associated formatting of the image such as alpha blending, transparency, fit to edge and other image transformations. Additional information may include where to place an image in the card, for example, top, bottom, right, left, etc. and what size or area in the card an image should occupy. Other additional information may include attributes such as background color, background pattern, background image, etc. with associated image transformation effects.

The following is an example of vCard data associated with an electronic business card according to this embodiment, where the [image data] portion would include traditional vCard data associated with the business card and where the [display definition or card design data] portion would include the display definition information described above.

BEGIN: VCARD
VERSION: 2.1
N: Doe; John
FN: John Doe
TITLE: Program Manager, ABC Corporation
EMAIL; PREF; INTERNET; doej@.abc.com
PHOTO; TYPE = JPEG; ENCODING = BASE64:
    [image data]

-continued

X-MS-OL-DESIGN; ENCODING = BASE64:
    [display definition or card design data]
REV: 1234567
UID: [unique identifier used to distinguish contact in receiving end]
END: VCARD According to this embodiment, the image that is sent includes a special tag (e.g., a word processing application bookmark tag) that is wrapped around the image that indicates the vCard attachment name for the electronic business card. According to one embodiment, a destination application will receive data of the following form:

```
<A name="John Doe">
    <IMG SRC= ... />
</A>
```

This tag is essentially an HTML "A" tag with a name but no source identifier. When the destination application receives such a tag or bookmark string, it will check to see if a vCard file with the same name as the "A" tag is attached. If the vCard file is attached, then the receiving application may enable functionality for updating or adding the electronic business card to an electronic contacts repository, as described herein. That is, when a user selects the rendered image, a menu or other user interface may be provided to allow data contained in the attached data file to be used for updating contact files, as described herein. If the card data file is not included as an attachment, then the receiving or destination application need not enable such functionality, and any image associated with the received data may be rendered as any received image would be rendered by the receiving application.

According to another embodiment, an electronic business card may be exchanged over digital media in JPEG format, and associated vCard information for the selected electronic business card may be embedded into the EXIF metadata of the JPEG image. As known to those skilled in the art, the Exchangeable Image File Format (EXIF) is a file format for allowing metadata information to be inserted into the headers or application segments of a JPEG file. Embedding vCard information within the JPEG image of the electronic business card allows for associated contact information to be persisted in the image when the image is exchanged through different digital media. According to this embodiment, when a receiving or consuming application receives the card, the receiving application may display the card according to the JPEG image, and the vCard information may be extracted from the EXIF metadata for use by the receiving application for generating an associated contact file or for updating a contact file on the receiving end. This embodiment can also apply to image types other than JPEG that allow including vCard information in the metadata of the image.

According to another embodiment, an electronic business card may be exchanged over digital media as an OLE object. According to this embodiment, card data and an associated image may be packaged together as an OLE object and may be sent to a receiving party for rendering and disposition by a receiving application, for example, an email or contacts application. According to this embodiment, card data such as name, address, telephone number, URL, formatting data, order of fields in the card, locations of images in the card, etc. may be brought together, for example, in an aforementioned vCard (.VCF) file. The card data and an associated image, for example, a JPEG or PNG image, are then packaged together in an OLE object. When the OLE object is received at a receiving application, the OLE object instructs the receiving application as to how to use the data and image. For example, the image may be displayed by the receiving application and the data may cause the receiving application to enable a function described herein for updating contact files or other use of the data. Thus, a receiving electronic contacts application 120 or electronic mail application may render the received electronic business card according to the desired format contained within the OLE object, and data, such as name, address, telephone number, URL, and the like, may be utilized by the receiving system according to the associated vCard data.

Figure 11:
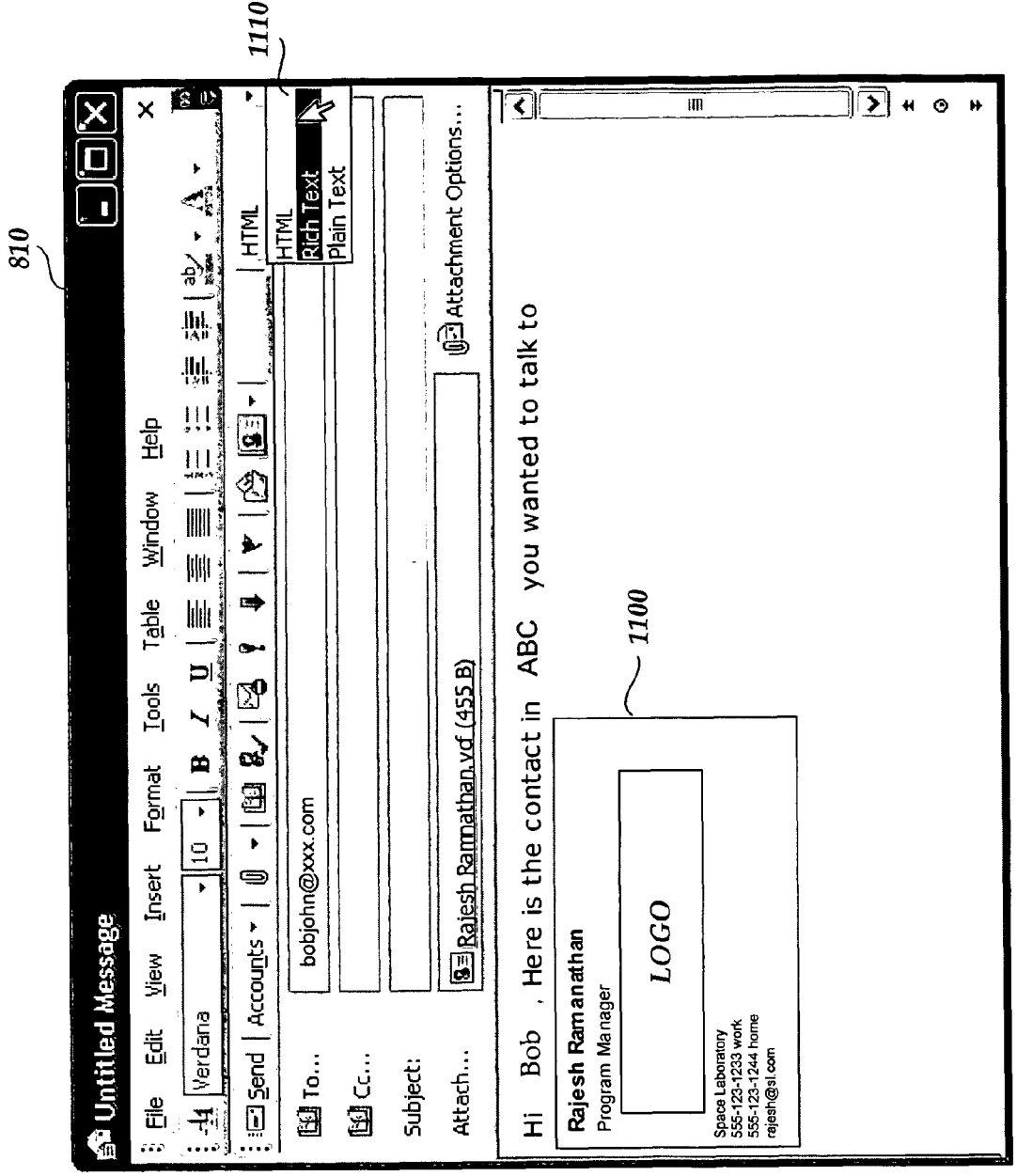
FIG. 11 illustrates a computer screen display of an electronic mail application user interface for sending electronic business card information according to an alternate presentation type.
Figure 12:
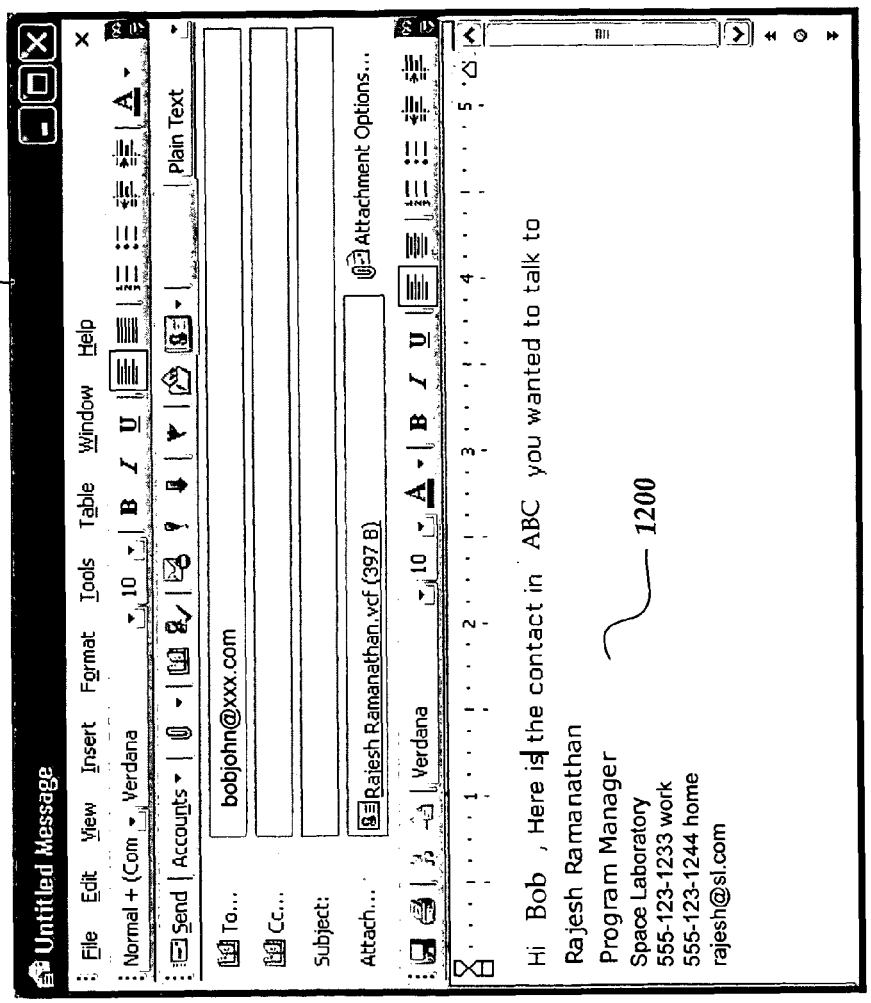
FIG. 12 illustrates a computer screen display of an electronic mail application user interface displaying a plain text form of the electronic business card being sent to a destination address.

Referring to FIG. 11, when a user inserts an electronic business card into an electronic mail message for sending to an intended recipient, the user may selectively send the electronic business card according to alternate formats. For example, as illustrated in FIG. 11, a formats selection menu 1110 is provided for allowing the user to send the inserted electronic business card according to different formats, for example, Hypertext Markup Language (HTML), rich text, or plain text. If the electronic business card 1100 inserted into an electronic mail message is set as plain text, for example, the recipient will receive a plain text version of the electronic business card, as illustrated in FIG. 12. That is, the formatting, structure and images associated with the electronic business card 1100 will not be rendered in the receiving email message 810, but the plain text data 1200 will be rendered in the body of the email message.

If sending the selected electronic business card according to a selected alternate format causes a degradation of the electronic business card in any manner, a dialog may be displayed for alerting the sending party that the formatted information in the electronic business card will be reformatted according to the selected formatting property and that some objects in the electronic business card, for example, pictures or images may be lost. As should be appreciated, the sender may desire to send an electronic business card to a recipient who is using a device that is better suited for receiving the information according to an alternate format. For example, if the recipient utilizes a personal digital assistant or other handheld computing device that is not capable of rendering and displaying the electronic business card according to all of its associated formatting properties, the sender may desire to send the information from the electronic business card in some format such as plain text or HTML for the benefit of the recipient.

Figure 13:
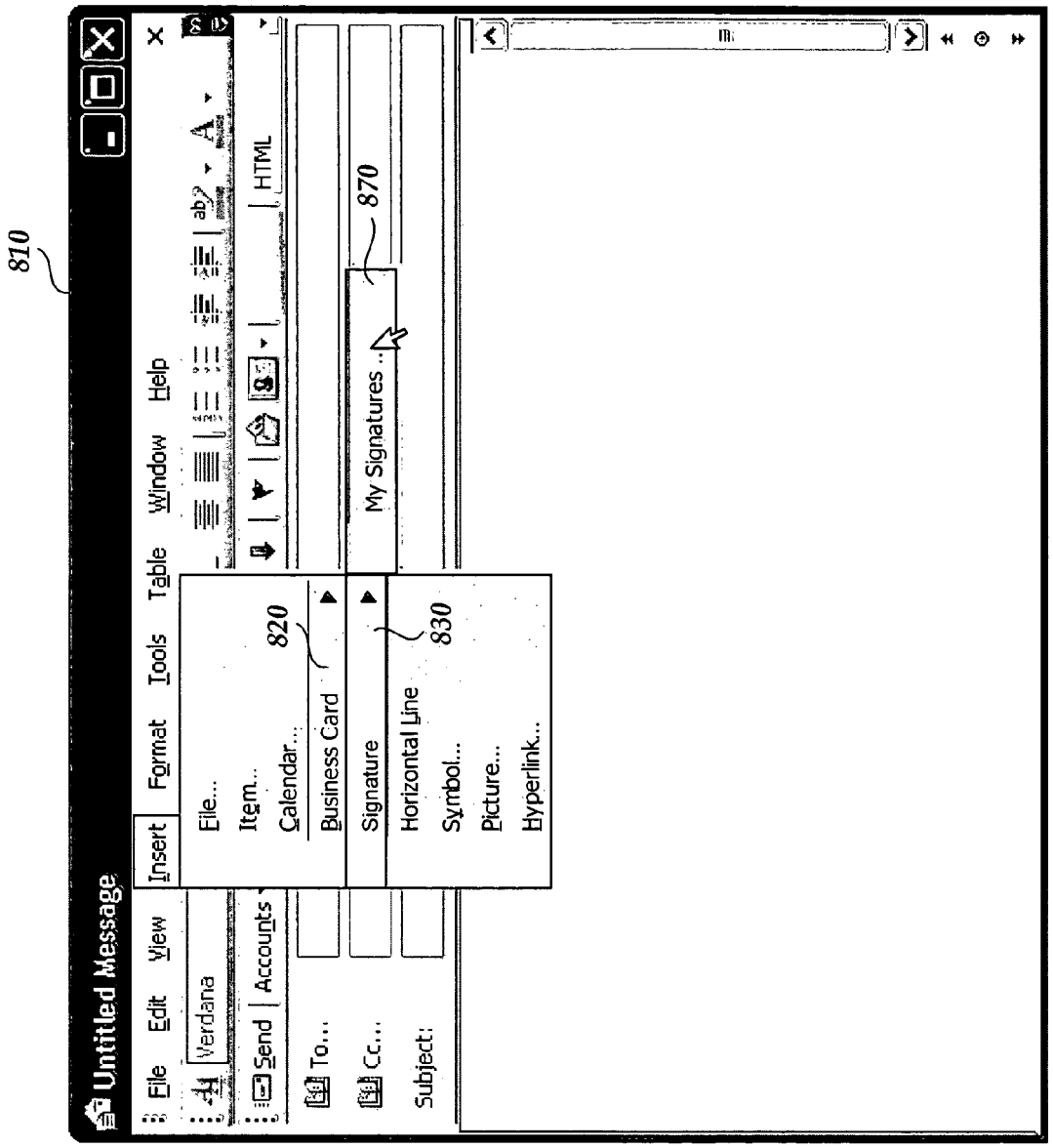
FIG. 13 illustrates a computer screen display of an electronic mail application user interface for inserting an electronic signature into an email message.

Referring now to FIG. 13, the addition of an electronic business card to an electronic mail signature is illustrated. According to embodiments of the invention, an electronic mail signature includes text and/or pictures or other images that may be automatically or manually added to the end of an outgoing electronic mail message. Custom signatures may be created for different receiving persons. For example, an electronic mail signature may include a first name only, a full name and title, an address, or other information a user desires to accompany electronic mail messages. Referring to FIG. 13, according to this embodiment, an electronic business card may be added to an electronic mail signature that will be added to the end of an outgoing electronic mail message.

Figure 14:
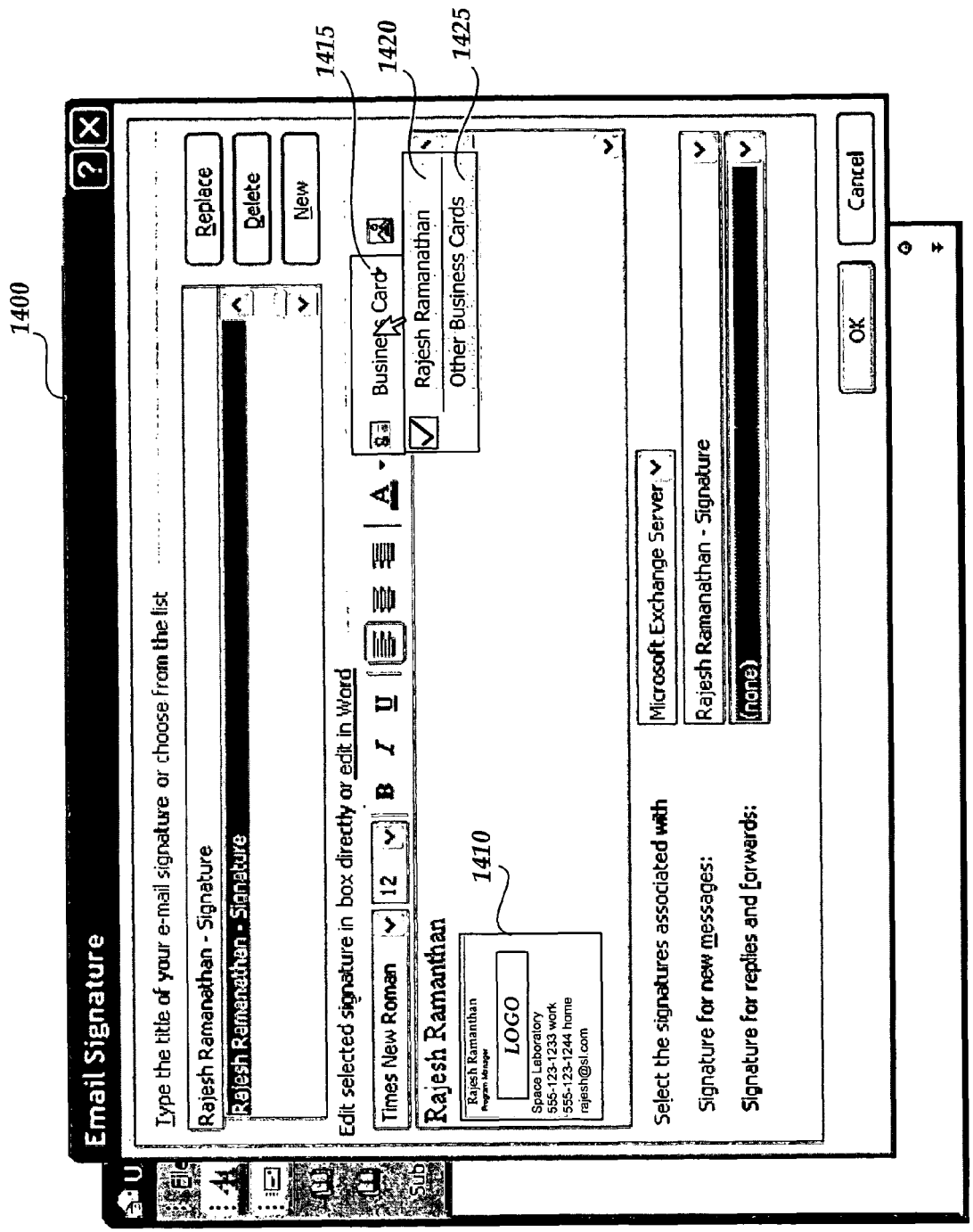
FIG. 14 illustrates a computer screen display of an electronic mail application user interface for inserting an electronic business card into an electronic mail signature.

As illustrated in FIG. 14, the electronic mail signature user interface 1400 is launched for adding a selected email signature to outgoing electronic mail messages. In addition to selecting a given electronic business card, the user may select the "business card" control 1415 for choosing a personal electronic business card 1420 or other electronic business cards 1425 for inclusion in the electronic mail signature.

Once a given electronic business card is selected, a thumbnail representation 1410 of the selected electronic business card is populated in the electronic mail signature user interface 1400. According to one embodiment, the thumbnail representation 1410 may be a dynamically created bitmap image of the associated electronic business card. When the outgoing electronic mail message is sent, the receiving party will be presented with an electronic business card along with any other electronic mail signature content prescribed by the sender. That is, the electronic signature at the end of the email body received by the receiving party will include the thumbnail electronic business card 1410 along with other signature information sent by the sender. It will be apparent to those skilled in the art that the behaviors and methods applicable to business cards inserted as part of signatures 1410 are the same as the behaviors and methods applicable to business cards that are inserted directly into an electronic mail message bodies. That is, schematized data associated with electronic business cards received via an electronic signature may be used for updating contact information and for saving an image of the received electronic business cards, as described above. For example, the embodiments of vCard attachments and associated JPEG images also apply to business cards attached to electronic signatures.

Updating Contacts Information From Received Electronic Business Cards

Figure 15:
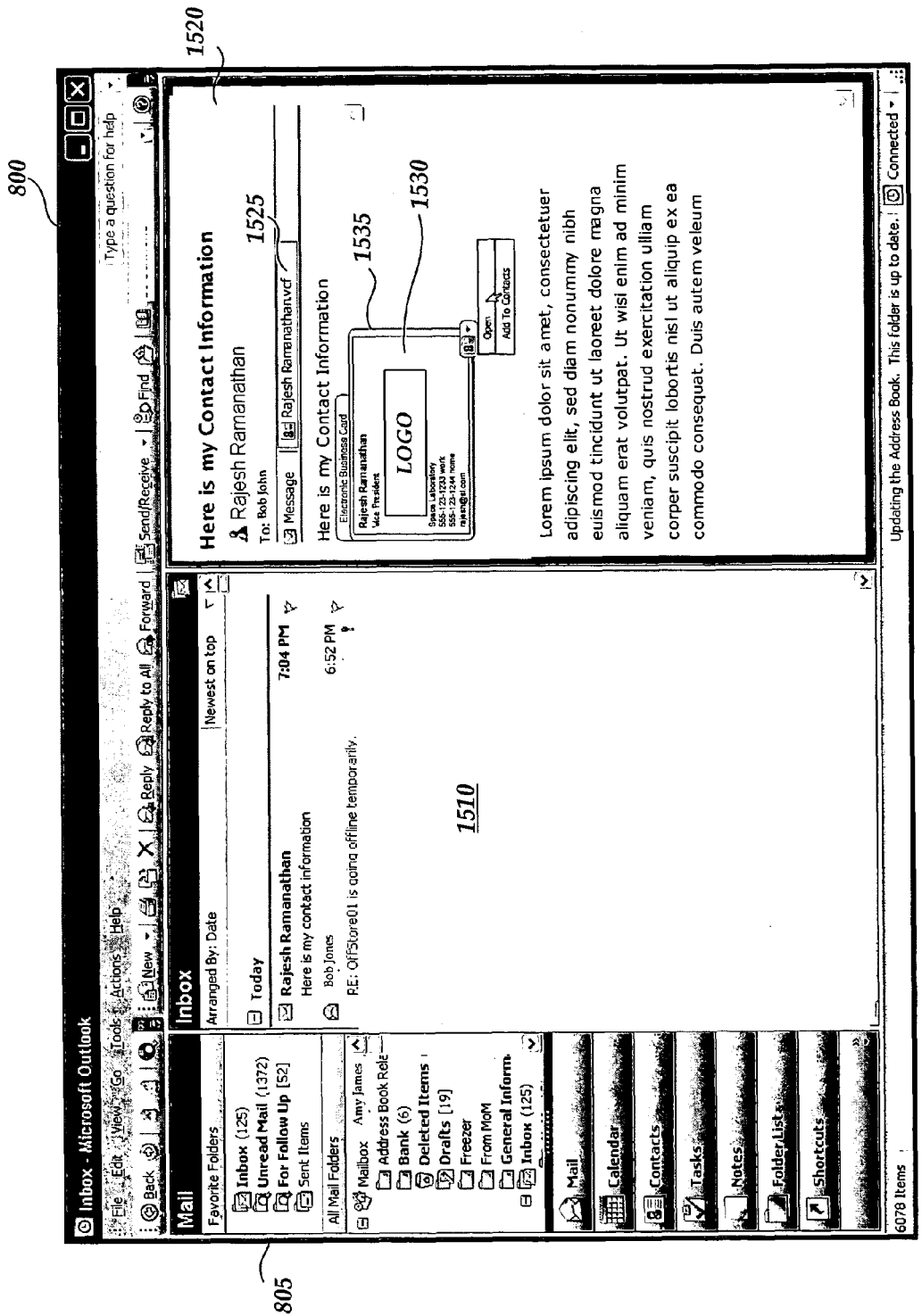
FIG. 15 illustrates a computer screen display of an electronic mail application user interface showing receipt of an electronic business card and showing how the electronic business card may be added to a user's contacts data repository.

Referring now to FIG. 15, an electronic mail user may receive an electronic business card from an electronic mail sender according to embodiments of the present invention. As illustrated in FIG. 15, an electronic mail application user interface 800 is shown having a navigation pane 805 for navigating through electronic mail folders and functionalities and an electronic mail inbox 1510 for displaying electronic mail items from a selected electronic mail folder. An electronic mail view pane 1520 provides a presentation of a selected electronic mail item displayed in the inbox 1510. As illustrated in FIG. 15, the electronic mail message received by the user contains an inserted electronic business card 1530. A halo or border 1535 is illustrated around the outer perimeter of the electronic business card 1530. According to an embodiment of the invention, the halo 1535 dynamically appears around the electronic business card when a cursor hover or other suitable focus is performed on the displayed electronic business card. If the hover or focus is removed, the halo 1535 disappears. The presence of the halo 1535 allows a user to quickly distinguish the electronic business card from any other image or object in the email message. As described above with reference to FIGS. 3 and 4, because the electronic business card 1530 includes or is associated with schematized structured data from an associated contact file, the electronic mail application operating the user interface 800 may render the electronic business card 1530 in the view pane 1520 and may utilize data associated with the card.

Figure 16:
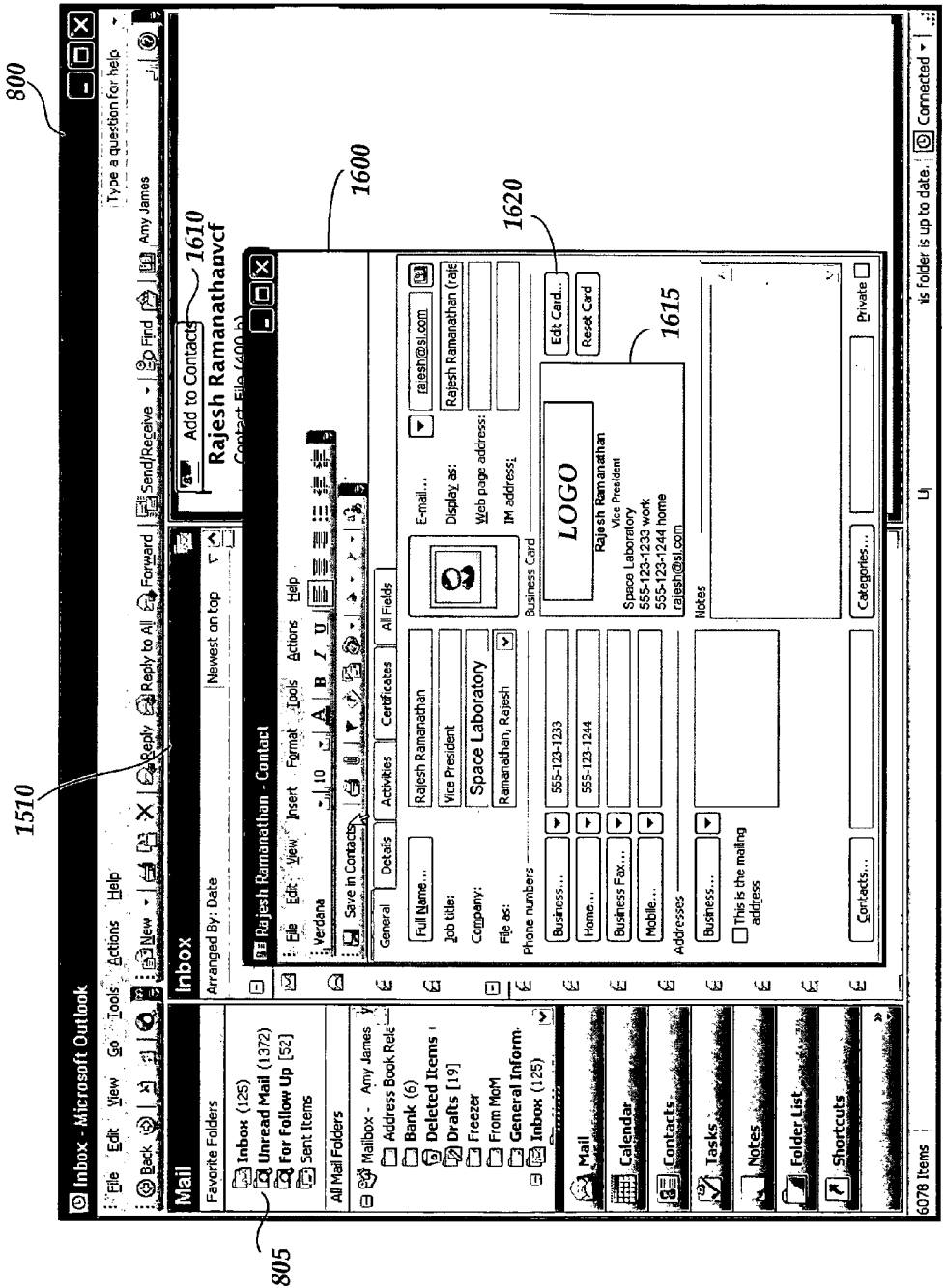
FIG. 16 illustrates a computer screen display of an electronic mail application user interface showing how a business card is represented as part of the contact information that may be edited from the associated contact data.

As illustrated in FIG. 16, when an electronic business card is received, the recipient may selectively add the electronic business card and/or the underlying contact information to the recipient's own electronic contacts repository. As illustrated in FIG. 16, upon selection of an "add to contacts" control 1610, a user interface 1600 is deployed for allowing the recipient to add the received electronic business card to her contacts repository. As described above with reference to FIGS. 3 and 4, the received electronic business card is structured according to a data structuring language, and the structure is applied to the underlying data according to an associated schema file. According to the embodiment illustrated in FIG. 16, the contacts information associated with the electronic business card 1530 is automatically populated into the user interface 1600 to show the recipient what will be saved to his/her contacts repository for the associated contact if she accepts the data. If the recipient already has a contact file for the received electronic business card, duplicative information or updated information is processed as described below for FIGS. 16-18.

Because the electronic business card is based on schematized structured data, the electronic contacts application 120 of the recipient may place the electronic business card in an electronic contacts repository. Because each data item in the received electronic business card is structured, the receiving electronic contacts application may parse the received electronic business card and may extract each data item for placement into an appropriate contact file. For example, names, address, telephone numbers, title, and the like associated with a received electronic business card may be extracted from the card and populated into the fields of an electronic contact file. Additionally, if the business card contains an image, such as a logo, photograph, or other art, data structuring associated with the image may be utilized by the receiving application for storing the image in the electronic contact file. Moreover, any formatting properties applied to the received electronic business card, for example, positioning of various data items in the business card, text styles, fonts, text sizes, etc., may be stored in the fields of the electronic contact files so that the receiving electronic contacts application may subsequently render and display the stored electronic business card according to the formatting properties and structure applied to the electronic business card by the sender of the electronic business card.

Figure 17:
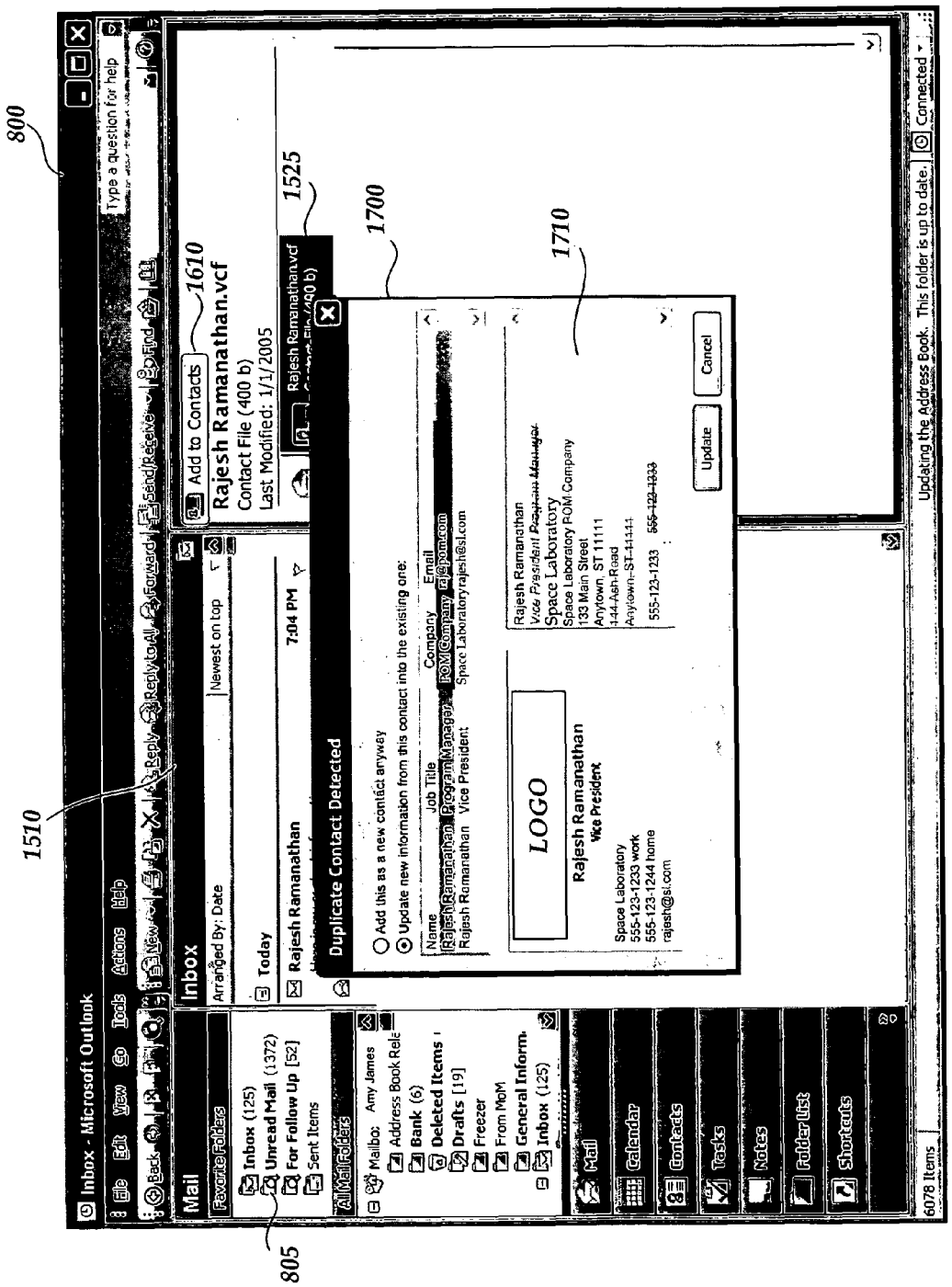
FIG. 17 illustrates a computer screen display of an electronic mail application user interface showing the processing of duplicate electronic business card information and showing data will be changed when selecting to merge a received electronic business card with an existing contact item in the user's contacts repository.

Referring now to FIG. 17, when a given electronic business card is selected for storing in the recipient's electronic contacts repository, the data associated with the electronic business card may be used to update one or more contact files contained in the contacts repository. If the recipient does not have contact information associated with the received electronic business card, then a new electronic contact file may be generated for storing the received electronic business card, as illustrated above in FIG. 16. However, if the recipient of the electronic business card already has contact information associated with the contact information contained in the received electronic business card, a comparison is made between the presently stored contact information and the contact information contained in the received business card.

As illustrated in FIG. 17, a dialog box 1700 may be displayed for alerting the user that information contained in the received electronic business card already exists in the user's contacts repository. If the information is duplicative of the presently stored contacts information, the user may elect to store the new information anyway by creating a new contact file for the received electronic business card. Alternatively, the user may elect to have the electronic contacts application update existing contacts information with contacts data elements contained in the newly received electronic business card. For example, if the address information extracted from the received electronic business card is different from the address associated with the same contact file in the user's contacts repository, the electronic contacts application 120 may extract the address from the newly received electronic business card and replace the existing address information for the associated contact with the address information from the newly received electronic business card.

As illustrated in FIG. 17, a view pane 1710 is provided for showing the receiving party the changes that will be made to her existing contact file if data from the received electronic business card is used to update her existing contact file. For example, referring to the view pane 1710, an example updated title is illustrated, and an example previous title is illustrated lined-through to show that it will be replaced. Also, an example previous address is illustrated lined-through below an updated address.

Referring back to FIG. 16, if the user elects to store the electronic business card or update existing contact information with information from the received electronic business card, the user interface 1600 shows contact information that has been populated into the contact file by the electronic contacts application 120 from information extracted from the received electronic business card. In addition, a visual representation 1615 of the electronic business card is displayed in the contact file user interface for review by the user.

According to one embodiment, if no previous contact file exists for the contact information contained in the electronic business card, the user interface 1600 may be automatically populated from information extracted from the electronic business card, as described above. Alternatively, if a contact file already exists for the associated contact information, then the information displayed in the user interface 1600 may be shown in its updated form after the electronic contacts application 120 has utilized information from the received electronic business card to update fields in the user interface 1600, for example, full name, job title, company, etc. If the user is satisfied with the information populated into the user interface 1600 by the contacts application, the user may save the information to the contact file for subsequent use.

Figure 18:
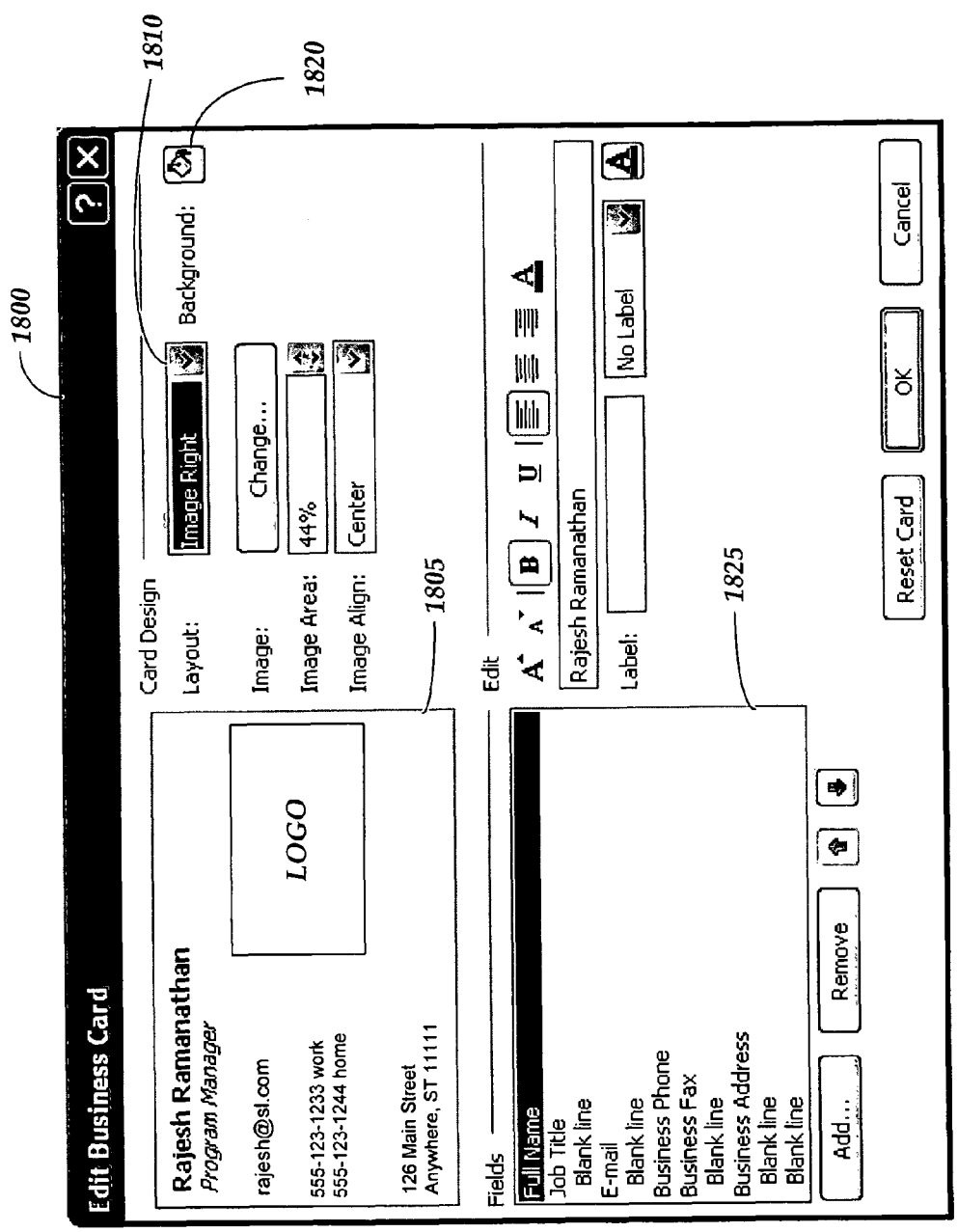
FIG. 18 illustrates a computer screen display of an electronic mail application user interface showing formatting of an electronic business card in a contact data item.

According to another embodiment of the invention, the received electronic business card may be edited by the receiving user. If edits to the received electronic business card are desired, an edit control, such as the example "Edit Card" control 1620, may be selected for launching a card editing user interface 1800, illustrated in FIG. 18. Referring to FIG. 18, the user interface 1800 allows a receiving user to edit the layout of data elements in the card and allows the user to add or remove data elements to or from the card. An image 1805 of the received electronic business card is displayed in an upper right-hand corner of the card. A layout edit control 1810 allows placement of an image 1830 contained in the card in different locations, for example, right, left, top, bottom, upper right, upper left, and so on. The displayed size and alignment of the image 1830 may also be edited. If the receiving user desires to add or remove individual contact data elements, for example, name, job title, business phone, etc., the contact data element fields 1825 may be selected for adding or removing individual contact data elements to or from the card. Once all desired changes are made to the received card, the edited card may be stored for subsequent use as described herein. In addition, according to another aspect of this embodiment, changes made to the card, for example, additions to contact data elements, may be saved in a receiving user's contacts data associated with the card.

As described above, electronic business cards may be consumed and used by a variety of consuming applications, for example, receiving contacts applications, receiving electronic mail applications, receiving electronic signature modules, and the like. An additional consumer of electronic business cards includes a mail merge function of a word processing application or other application operative to merge contact data automatically with fields of a document. As known to those skilled in the art, a mail merge function allows integration of contacts information with other documents. For example, a letter document may be linked with a contact file in the user's contacts repository so that when the document is rendered, data from the associated contact file may be retrieved for automatically populating fields in the letter, such as name, address, telephone number, etc.

According to embodiments of the present invention, an electronic business card may be sent to a selected document via a mail merge function. That is, using a mail merge function, a portion of a document for which contacts information for a given contact is required may be pointed to an electronic business card for the contact. The receiving document may extract required information from the electronic business card such as name, title and address for populating the associated portion of the document. As should be appreciated, a single document may be pointed to a number of electronic business cards so that the mail merge function may be used for generating a document for each of the number of electronic business cards.

As described herein, graphical visual representations of electronic business cards may be generated and sent and received over digital media. Contacts information associated with received electronic business cards may be used for adding to or updating information contained in a recipient's electronic contact files repository. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-storage medium containing computer executable instructions which, when executed by a computer, perform a method of sending an electronic business card to a receiving address, comprising:
   providing one or more electronic business cards for an electronic contact file in one or more electronic contacts repositories, the electronic business card structured and schematized to be consumed and rendered by a plurality of applications, wherein each of the one or more electronic business cards includes a prescribed layout and one or more contact data elements of the associated business card, and wherein the one or more prescribed layouts are defined by one of:
      a custom design; and
      a template that defines the positioning of contact data elements on the electronic business card, the background color of the electronic business card, and the font size of text on the electronic business card, wherein the template is selected from a plurality of templates;
   receiving a request to compose an electronic mail message;
   displaying a form for the electronic mail message in an electronic mail message user interface;
   receiving text in the form for the electronic mail message;
   breaking at least a first portion of the text into one or more individual words;
   comparing at least the individual words of the first portion of the received text to the one or more contact data elements;
   determining that at least one of the individual words of the first portion of the received text matches at least a first contact data element;
   highlighting the at least one individual word of the first portion of the received text in the electronic mail message user interface;
   receiving a selection of the highlighted at least one individual word of the first portion of the received text;
   in response to receiving the selection of the highlighted at least one individual word of the first portion, inserting a first electronic business card associated with the first contact data element into the electronic mail message;
   transmitting the electronic mail message including the text and the first electronic business card to the receiving address.

2. The computer-storage medium of claim 1, whereby inserting the electronic business card includes rendering the visual representation of the first electronic business card in the electronic mail message user interface.

3. The computer storage medium of claim 1, wherein the method further comprises:
   generating an image of the first electronic business card;
   providing a tag for the image to indicate, if the image is selected at the receiving address, that the electronic business card is attached to the electronic mail message;
   inserting the image and the tag into the electronic mail message.

4. The computer storage medium of claim 3, wherein the first electronic business card includes contact data elements that are not included in the image.

5. The computer storage medium of claim 1, wherein the method further comprises:
   receiving logon credentials from a user;
   receiving a selection from the user to insert a second electronic business card into the electronic mail message, wherein the second electronic business card includes contact data elements for the user and a second prescribed layout;
   automatically populating contact data elements of the second electronic business card with at least some of the logon credentials;
   inserting the second electronic business card into the electronic mail message.

6. The computer storage medium of claim 5, wherein the user is a member of an organization and wherein:
   a first portion of the second prescribed layout is preset for all members of the organization and a second portion of the prescribed layout may be customized by the user.

7. The computer-storage medium of claim 1, wherein the at least one individual words comprises at least one number.

8. A method of sending an electronic business card to a receiving address, comprising:
   launching an electronic mail message user interface;
   receiving a selection for inserting an electronic business card in the electronic mail message user interface, the electronic business card structured and schematized to be consumed and rendered by a plurality of applications, wherein the electronic business card includes one or more contact data elements from an associated electronic contact file, and wherein the one or more prescribed layouts are defined by one of:
      a custom design; and
      a template that defines the positioning of the one or more contact data elements on the electronic business card, the background color of the electronic business card, and the font size of text on the electronic business card, wherein the template is selected from a plurality of templates;
   whereby receiving a selection for inserting the electronic business card in the electronic mail message user interface includes:
      receiving a text entry in the electronic mail message user interface;
      breaking one or more portions of the text into one or more individual words;
      comparing the one or more individual words to the one or more electronic contact files;
      determining that the one or more individual words of the one or more portions of the text entry matches the one or more contact data elements in the one or more electronic contact files; and providing a selection of the electronic business card matching one of the one or more electronic contact files, wherein the a selection of the electronic business card is provided by a pop-up dialog that offers a selectable action for inserting the electronic business card matching one of the one or more electronic contact files;

in response to receiving a selection for inserting the electronic business card in the electronic mail message user interface, rendering a visual image representation of the selected electronic business card in the electronic mail message user interface; and in response to a selection for transmitting an electronic mail message associated with the electronic mail message user interface, transmitting the electronic mail message including the text and the inserted visual image representation of the selected electronic business card to the receiving address.

9. The method of claim 8, whereby prior to rendering a visual representation of the selected electronic business card in the electronic mail message user interface, if no visual representation has previously been generated for the selected electronic business card, automatically generating a visual representation for the selected electronic business card using one or more contact data elements from a contact file associated with the selected electronic business card.

10. The method of claim 8, further comprising:
generating an image of the electronic business card;
providing a tag for the image to indicate, if the image is selected at the receiving address, that the electronic business card is attached to the electronic mail message;
inserting the image and the tag into the electronic mail message.

11. The method of claim 8, wherein the electronic business card includes contact data elements that are not included in the image.

12. The method of claim 8, further comprising:
receiving logon credentials from a user;
receiving a selection from the user to insert a second electronic business card into the electronic mail message, wherein the second electronic business card includes contact data elements for the user and a second prescribed layout;
automatically populating contact data elements of the second electronic business card with at least some of the logon credentials;
inserting the second electronic business card into the electronic mail message.

13. The method of claim 12, wherein the user is a member of an organization and wherein:
a first portion of the second prescribed layout is preset for all members of the organization and a second portion of the second prescribed layout may be customized by the user.

14. A system for sending an electronic business card to a receiving address, comprising:
a computer processing unit;
a memory, communicatively coupled to the computer processing unit, and containing instructions that, when executed by the computer processing unit, cause the computer processing unit to perform the following method:
providing one or more electronic business cards for an electronic contact file in one or more electronic contacts repositories, the electronic business card structured and schematized to be consumed and rendered by a plurality of applications, wherein each of the one or more electronic business cards includes a prescribed layout and one or more contact data elements of the associated business card, and wherein the one or more prescribed layouts are defined by one of:
a custom design; and
a template that defines the positioning of the one or more contact data elements on the electronic business card, the background color of the electronic business card, and the font size of text on the electronic business card, wherein the template is selected from a plurality of templates;
receiving a request to compose an electronic mail message;
displaying a form for the electronic mail message in an electronic mail message user interface;
receiving text in the form for the electronic mail message;
breaking one or more portions of the received text into one or more individual words;
comparing at least one of the individual words of the one or more portions of the received text to the one or more contact data elements;
determining that at least one of the individual words of the one or more portions of the received text matches at least a first contact data element;
highlighting the at least one of the individual words of the received text in the electronic mail message user interface;
receiving a selection of the highlighted at least one individual word of the received text;
in response to receiving the selection of the highlighted at least one individual word, displaying a pop-up dialog that offers a selectable action for inserting the electronic business card matching one of the one or more electronic contact files;
in response to receiving a selectable action for inserting the electronic business card matching one of the one or more electronic contact files in the pop-up dialog, inserting a first electronic business card associated with the first contact data element into the electronic mail message;
receiving logon credentials from a user;
receiving a selection from the user to insert a second electronic business card into the electronic mail message, wherein the second electronic business card includes contact data elements for the user and a second prescribed layout;
automatically populating contact data elements of the second electronic business card with at least some of the logon credentials; and
inserting the second electronic business card into the electronic mail message; and
transmitting the electronic mail message including the text, the first electronic business card and the second electronic business card to the receiving address.

15. The system of claim 14, wherein the method further comprises:
generating an image of the first electronic business card;
providing a tag for the image to indicate, if the image is selected at the receiving address, that the electronic business card is attached to the electronic mail message;
inserting the image and the tag into the electronic mail message.

16. The system of claim 15, wherein the first electronic business card includes contact data elements that are not included in the image.

17. The system of claim 14, wherein the user is a member of an organization and wherein:
a first portion of the second prescribed layout is preset for all members of the organization and a second portion of the prescribed layout may be customized by the user.

* * * * *